United States Patent
Zalewski

(10) Patent No.: US 10,974,137 B2
(45) Date of Patent: *Apr. 13, 2021

(54) INCREASING THE NUMBER OF ADVERTISING IMPRESSIONS IN AN INTERACTIVE ENVIRONMENT

(71) Applicant: Sony Interactive Entertainment LLC, San Mateo, CA (US)

(72) Inventor: Gary M. Zalewski, Piedmont, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/425,822

(22) Filed: May 29, 2019

(65) Prior Publication Data

US 2019/0275421 A1 Sep. 12, 2019

Related U.S. Application Data

(63) Continuation of application No. 15/792,368, filed on Oct. 24, 2017, now Pat. No. 10,343,060, which is a (Continued)

(51) Int. Cl.
*A63F 13/25* (2014.01)
*G06Q 30/02* (2012.01)
(Continued)

(52) U.S. Cl.
CPC .............. *A63F 13/25* (2014.09); *A63F 13/00* (2013.01); *G06Q 30/02* (2013.01);
(Continued)

(58) Field of Classification Search
None
See application file for complete search history.

(56) References Cited

U.S. PATENT DOCUMENTS 5,416,247 A 5/1995 Webster
5,946,664 A 8/1999 Ebisawa
(Continued)

FOREIGN PATENT DOCUMENTS

| CN | 1882080 A | 12/2006 |
|---|---|---|
| CN | 1783980 B | 5/2011 |
| JP | 2002259823 A | 9/2002 |

OTHER PUBLICATIONS

Chinese Office Action for CN Application No. 200810179926.6, dated Nov. 17, 2015.
(Continued)

*Primary Examiner* — Ronald Laneau
(74) *Attorney, Agent, or Firm* — JDI Patent; Joshua Isenberg; Robert Pullman

(57) ABSTRACT

Increasing a number of advertising impressions in a system configured to facilitate user interaction with an interactive environment containing one or more advertising targets is described. A scene of a portion of the simulated environment is displayed from a camera point of view (camera POV) on a video display. The scene may change as the camera POV changes in response to movement of the camera POV along a camera path during the user's interaction with the simulated environment. Modifying the camera path or a camera field of view can place more of an advertising target within the displayed scene to increase a likelihood of generating an advertising impression. The advertising target is characterized by a field of attraction of the camera POV.

17 Claims, 8 Drawing Sheets

US 10,974,137 B2
Page 2

Related U.S. Application Data continuation of application No. 15/056,992, filed on Feb. 29, 2016, now Pat. No. 9,795,875, which is a continuation of application No. 13/858,853, filed on Apr. 8, 2013, now Pat. No. 9,272,203, which is a continuation of application No. 12/210,105, filed on Sep. 12, 2008, now Pat. No. 8,416,247.

(60) Provisional application No. 60/978,689, filed on Oct. 9, 2007.

(51) Int. Cl.
  *A63F 13/00* (2014.01)
  *G06T 19/00* (2011.01)
  *G06T 19/20* (2011.01)

(52) U.S. Cl.
  CPC ..... *G06Q 30/0207* (2013.01); *G06Q 30/0244* (2013.01); *G06Q 30/0264* (2013.01); *G06T 19/003* (2013.01); *G06T 19/20* (2013.01)

(56) References Cited

U.S. PATENT DOCUMENTS

| | | | |
|---|---|---|---|
| 6,882,978 B2 | 4/2005 | Ebisawa | |
| 6,995,788 B2 | 2/2006 | James | |
| 7,047,302 B1 | 5/2006 | Chatani et al. | |
| 7,085,733 B2 | 8/2006 | Ebisawa | |
| 7,171,480 B2 | 1/2007 | Chatani | |
| 8,156,004 B2 | 4/2012 | Wajihuddin | |
| 8,416,247 B2 | 4/2013 | Zalewski | |
| 8,795,076 B2* | 8/2014 | van Datta | G06Q 30/0257 463/33 |
| 2002/0004855 A1 | 1/2002 | Cox et al. | |
| 2002/0120589 A1 | 8/2002 | Aoki | |
| 2003/0055889 A1 | 3/2003 | Chen et al. | |
| 2003/0107647 A1 | 6/2003 | James | |
| 2003/0214530 A1 | 11/2003 | Wang et al. | |
| 2004/0001476 A1 | 1/2004 | Islam et al. | |
| 2005/0119934 A1 | 6/2005 | Kamiyama | |
| 2006/0129688 A1 | 6/2006 | Chatani et al. | |
| 2006/0136964 A1 | 6/2006 | Diez et al. | |
| 2006/0143268 A1 | 6/2006 | Chatani | |
| 2007/0008575 A1 | 1/2007 | Yu et al. | |
| 2007/0026761 A1 | 2/2007 | Moomaw | |
| 2007/0043616 A1 | 2/2007 | Kutaragi et al. | |
| 2007/0061413 A1 | 3/2007 | Larsen et al. | |
| 2007/0072676 A1 | 3/2007 | Baluja | |
| 2007/0078706 A1* | 4/2007 | Datta | G06Q 30/0261 705/14.5 |
| 2007/0078989 A1 | 4/2007 | Van Datta et al. | |
| 2007/0079326 A1 | 4/2007 | Datta et al. | |
| 2007/0079331 A1 | 4/2007 | Datta et al. | |
| 2007/0188493 A1 | 8/2007 | Kondo et al. | |
| 2007/0243930 A1 | 10/2007 | Zalewski et al. | |
| 2007/0244751 A1 | 10/2007 | Zalewski et al. | |
| 2007/0255630 A1 | 11/2007 | Zalewski et al. | |
| 2007/0260517 A1 | 11/2007 | Zalewski et al. | |
| 2007/0261077 A1 | 11/2007 | Zalewski et al. | |
| 2008/0006375 A1 | 1/2008 | Meadows | |
| 2008/0114645 A1 | 5/2008 | Zalewski | |
| 2008/0115045 A1 | 5/2008 | Mallinson | |
| 2008/0115229 A1 | 5/2008 | Mallinson | |
| 2008/0169930 A1 | 7/2008 | Mallinson | |
| 2008/0206732 A1 | 8/2008 | Zalewski | |
| 2008/0214253 A1 | 9/2008 | Gillo et al. | |
| 2008/0215679 A1 | 9/2008 | Gillo et al. | |
| 2008/0215971 A1 | 9/2008 | Gillo et al. | |
| 2008/0215972 A1 | 9/2008 | Zalewski et al. | |
| 2008/0215973 A1 | 9/2008 | Zalewski et al. | |
| 2008/0231751 A1 | 9/2008 | Zalewski | |
| 2008/0235582 A1 | 9/2008 | Zalewski et al. | |
| 2008/0307103 A1 | 12/2008 | Marr et al. | |
| 2008/0307412 A1 | 12/2008 | Marr et al. | |
| 2009/0006375 A1 | 1/2009 | Lax et al. | |
| 2009/0173712 A1 | 7/2009 | Lee et al. | |
| 2009/0300144 A1* | 12/2009 | Marr | A63F 13/525 709/219 |
| 2010/0173712 A1 | 7/2010 | Buhr | |
| 2014/0063061 A1 | 3/2014 | Reitan | |
| 2016/0018645 A1 | 1/2016 | Haddick et al. | |
| 2016/0050465 A1 | 2/2016 | Zaheer et al. | |

OTHER PUBLICATIONS

Chinese Office Action dated Oct. 31, 2013 issued for Chinese Patent Application No. 200810179926.6.
EPO Communication dated Nov. 14, 2012 for European Patent Application No. 08253116.1.
EPO Communication dated Nov. 14, 2012 issued for European Patent Application No. 08253116.1.
Extended European search report dated Feb. 23, 2011 for European Patent Application No. 08253116.1.
Extended European Search Report dated Feb. 23, 2011 issued for European Patent Application No. 08253116.1.
International Search Report and Written Opinion of the International Searching Authority dated Sep. 12, 2008 for the International Application No. PCT/US2008/066181, 8 pages.
International Search Report and Written Opinion of the International Searching Authority dated Sep. 2, 2008 for the International Application No. PCT/US2008/066174, 9 pages.
Japan Office Action dated Mar. 22, 2012 for Japan Application No. 2008-263223.
Japan Office Action dated Mar. 22, 2012 for Japanese Patent Application No. 2008-263223.
Japanese Final Notification of Reasons for Refusal dated Feb. 19, 2013 issued for Japanese Patent Application No. 2008-263223.
Japanese Office Action for JP Application No. 2013-112103, dated Aug. 12, 2014.
Non-final Office Action dated Jul. 19, 2018 for U.S. Appl. No. 15/792,368.
Non-Final Office Action for U.S. Appl. No. 13/858,853, dated May 7, 2015.
Non-Final Office Action for U.S. Appl. No. 15/056,992, dated Aug. 18, 2016.
Non-Final Office Action for U.S. Appl. No. 15/056,992, dated Jan. 23, 2017.
Non-Final/Final Office Action for U.S. Appl. No. 15/792,368, dated Dec. 14, 2018.
Notice of Allowance for U.S. Appl. No. 15/792,368, dated Feb. 28, 2019.
Notice of Allowance for U.S. Appl. No. 13/858,853, dated Oct. 23, 2015.
Notice of Preliminary Rejection dated Aug. 25, 2010 issued for Korean Patent Application No. 10-2008-99111.
Notice of Preliminary Rejection dated Aug. 25, 2010 issued for Korean Patent Application Np. 10-2018-99111.
Office Action dated Oct. 31, 2013 for Chinese Patent Application No. 200810179926.6.
PCT International Search Report dated Jul. 16, 2009 for International Patent Application No. PCT/US2009/044737.
PCT International Search Report dated Jul. 16, 2009 issued for PCT International Patent Application No. PCT/US2009/044737.
Reexamination notice for CN application 200810179926.6, dated Apr. 27, 2015.
Sony Computer Entertainment Incorporated, "Cell Broadband Engine Architecture", Version 1.0, Aug. 8, 2005.
U.S. Appl. No. 12/132,568 entitled "Hint-Based Streaming of Auxiliary Content Assests for an Interactive Environment" filed by James E. Marr on Jun. 3, 2008.
U.S. Appl. No. 12/132,568 entitled "Hint-Based Streaming of Auxiliary Content Assets for an Interactive Environment" filed by James E. Marr on Jun. 3, 2008.
U.S. Appl. No. 60/798,240, to Glen Van Datta et al., entitled "Population of an Advertisement Reference List " filed May 5, 2006.
U.S. Appl. No. 60/798,381, to Glen Van Datta et al., entitled "Advertisement Rotation" filed May 5, 2006.

(56) References Cited

OTHER PUBLICATIONS

U.S. Appl. No. 60/798,689, to Gary M. Zalewski, entitled "Increasing the Number of Advertising Impressions in an Interactive Environment" filed on Oct. 9, 2007.
U.S. Appl. No. 60/978,689 entitled "Increasing the Number of Advertising Impressions in an Interactive Environment" filed by Gary M. Zalewski on Oct. 9, 2007.

* cited by examiner

INCREASING THE NUMBER OF ADVERTISING IMPRESSIONS IN AN INTERACTIVE ENVIRONMENT

CLAIM OF PRIORITY

This application is a continuation of commonly-assigned co-pending U.S. patent application Ser. No. 15/792,368, filed Oct. 24, 2017, the entire contents of which are incorporated herein by reference.

U.S. patent application Ser. No. 15/792,368 is a continuation of commonly-assigned U.S. patent application Ser. No. 15/056,992, filed Feb. 29, 2016, now U.S. Pat. No. 9,795,875, the entire contents of which are incorporated herein by reference.

Application Number is a continuation of commonly-assigned U.S. patent application Ser. No. 15/056,992, filed Feb. 29, 2016, now U.S. Pat. No. 9,795,875, the entire contents of which are incorporated herein by reference.

U.S. patent application Ser. No. 15/056,992 is a continuation of commonly-assigned U.S. patent application Ser. No. 13/858,853, filed Apr. 8, 2013, now U.S. Pat. No. 9,272,203, the entire contents of which are incorporated herein by reference.

U.S. patent application Ser. No. 13/858,853 is a continuation of commonly-assigned U.S. patent application Ser. No. 12/210,105 filed Sep. 12, 2008, now U.S. Pat. No. 8,416,247, the entire contents of which are incorporated herein by reference.

U.S. patent application Ser. No. 12/210,105 claims the benefit of priority of commonly-assigned U.S. Provisional Patent Application No. 60/978,689, filed Oct. 9, 2007, the entire contents of which are incorporated herein by reference.

FIELD OF THE INVENTION

This invention is related to advertising in an interactive environment and more particularly to increasing the number of advertising impressions in an interactive environment.

BACKGROUND OF THE INVENTION

An important criterion for advertisers in determining the effectiveness of an advertising campaign is the number of "impressions" a given advertisement makes with a user of interactive entertainment. Impressions refer to the exposure a user has had to an ad or ad campaign. Impressions are typically indexed in to the number of times a potential consumer views a particular advertisement. For example, a print advertisement located in a kiosk in a shopping center might be viewed by 1,000 shoppers over the course of an afternoon. It could be said that the particular advertisement enjoyed 1,000 impressions as each shopper walked past the kiosk and viewed the goods or services advertised therein.

The growth of the Internet and the popularity of interactive entertainment such as video games have led to opportunities for advertising within video games. Video games and other forms of interactive entertainment have been increasingly popular among members of demographic groups sought after by advertisers. Consequently, advertisers are willing to pay to have advertisements for their products and/or services within interactive entertainment, such as video games.

There have been—and continue to be—numerous cases wherein actual advertisements of advertisers are deployed and displayed within a video game environment. A classic example is in a driving game, wherein advertisements are pasted onto billboards around a driving course as illustrated in U.S. Pat. Nos. 5,946,664 and 6,539,544, the disclosures of which are incorporated herein by reference. With such in-game advertising, the software publishing company that creates the video game identifies an advertiser, creates texture data based on ad copy provided by the advertiser and places this texture data representative of an advertisement in the video game environment (i.e., posting the advertisement on the billboard).

U.S. Pat. No. 5,946,664 to Kan Ebisawa describes the general notion of using a network to replacing an asset within a game using a texture, e.g., billboard. Later schemes for calculating a magnitude of an advertising impressing based on a position of a frustum of a camera proximity and time exposure to a game asset.

Placement of advertisements in the virtual environments of computer video games may be enhanced by matching ads to demographic data of the game player, e.g. as described, e.g., in U.S. Pat. No. 6,036,601, which is incorporated herein by reference. An ad server coordinates the matching of ads to demographic data of the game player and properly accommodates ads in formats from game information provided by source of game software. Statistics related to ad impressions may be retrieved from the game player's computer or console to rate viewing effectiveness for ad placement confirmation and billing purposes.

There are numerous formulae for determining whether an impression has occurred. A typical formula takes into account factors such as (a) whether an advertisement was displayed to the user, e.g., on a video screen; (b) how long the ad was visible to the user; (c) where the ad appeared on the screen; (d) how large the ad was relative to the size of the screen. US Published patent application 20070079331, which is incorporated herein by reference, describes examples of possible systems and methods for determining advertising impressions in the context of a video game. Basic schemes for calculating a magnitude or quality of a viewer impression of a game asset may be based on, e.g., a frustum of the camera, proximity and exposure to the asset.

The number of advertising impressions generated by a user during interactive entertainment is somewhat dependent on the user's activity during an interactive entertainment session. Consequently, the number of impressions generated may vary from one user to another for the same interactive entertainment activity. Attempts have been made to enhance the number of user impressions of video game advertisements by directing the viewer's attention to the ads. For example, in 1997 in a game called RTIME Rocks a virtual vector compass pointed the user in the direction of the nearest advertising asset in the game. However, an individual user may still choose to ignore the compass and valuable advertising impressions may be missed as a result.

It is within this context that embodiments of the invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

According to embodiments of the present invention, in addition to movement initiated by user commands and a state of interaction with a simulated environment, movement may also be added to a camera path that directs the camera point-of-view toward advertising targets along encountered along the camera path. These movements may be configured to place the advertising targets within a field-of-view, referred to herein as a camera frustum, thereby increasing the likelihood of advertising impressions for those targets. In some embodiments, these movements may be initiated independent of any user-initiated movement commands or interaction with the simulated environment based on simulated physics. Addition of such movement to the camera path may be particularly desirable in situations where a relatively slight and/or relatively brief deviation of the camera path or camera POV is sufficient to generate an impression of an advertising target that would not have been generated absent the deviation.

Figure 1A:
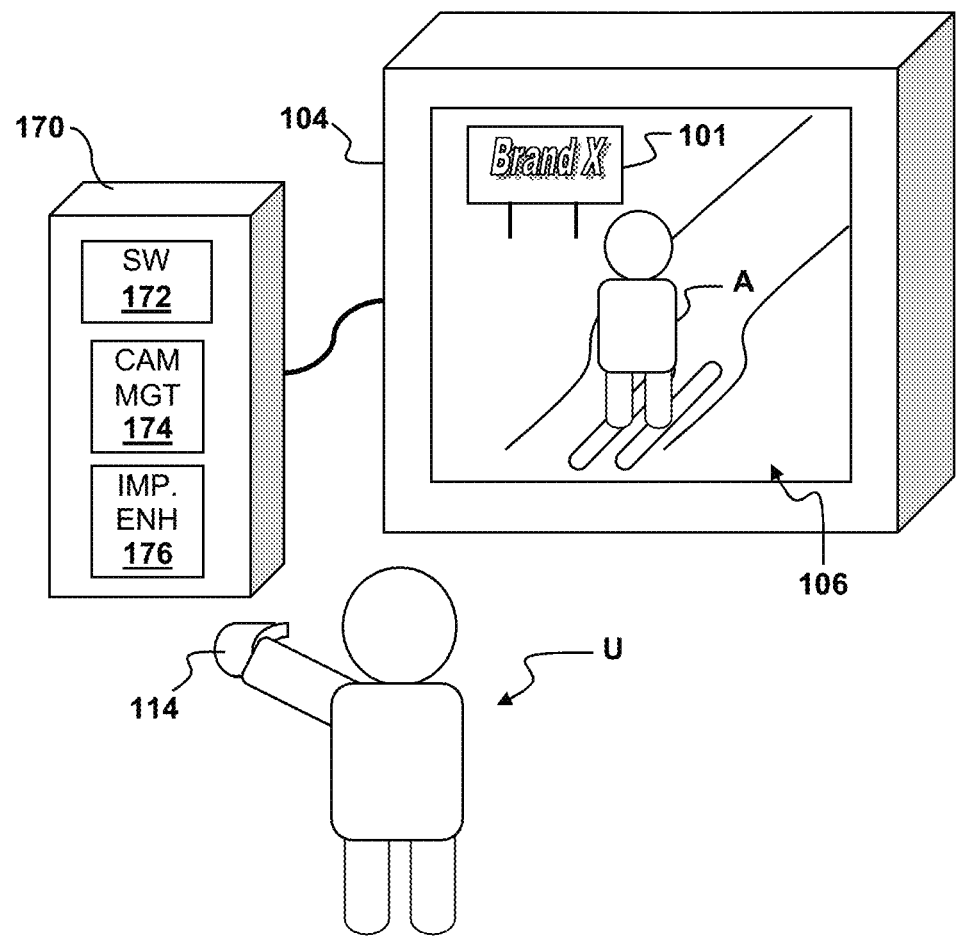
FIG. 1A illustrates an example of advertising within a simulated environment.

According to an embodiment, a computer-implemented method for increasing a number of advertising impressions in a system configured to facilitate user interaction with an interactive environment containing one or more advertising targets is provided. FIG. 1A illustrates an example of a simulated environment containing advertising. Examples of suitable simulated environments include, but are not limited to, video games and interactive virtual worlds. Examples of virtual worlds are described in commonly assigned U.S. patent application Ser. Nos. 11/682,281, 11/682,284, 11/682,287, 11/682,292, 11/682,298, and 11/682,299, the contents of all of which are incorporated herein by reference.

By way of example, the simulated environment may be generated using simulation software 172 running on a user client device 170. Execution of the software 172 on the client device 170 causes images to be displayed on the video display 104. The simulated environment may include one or more advertising targets 101. Examples of advertising targets are described, e.g., in U.S. Patent Published Patent Application Number 20070079331, which has been incorporated herein by reference in its entirety for all purposes. A scene 106 displayed to the user U may be controlled, at least in part, by a camera management system 174 operable with the simulated environment. The camera management system 174 may be implemented on the client device 170 through suitable configured hardware or software.

Figure 1B:
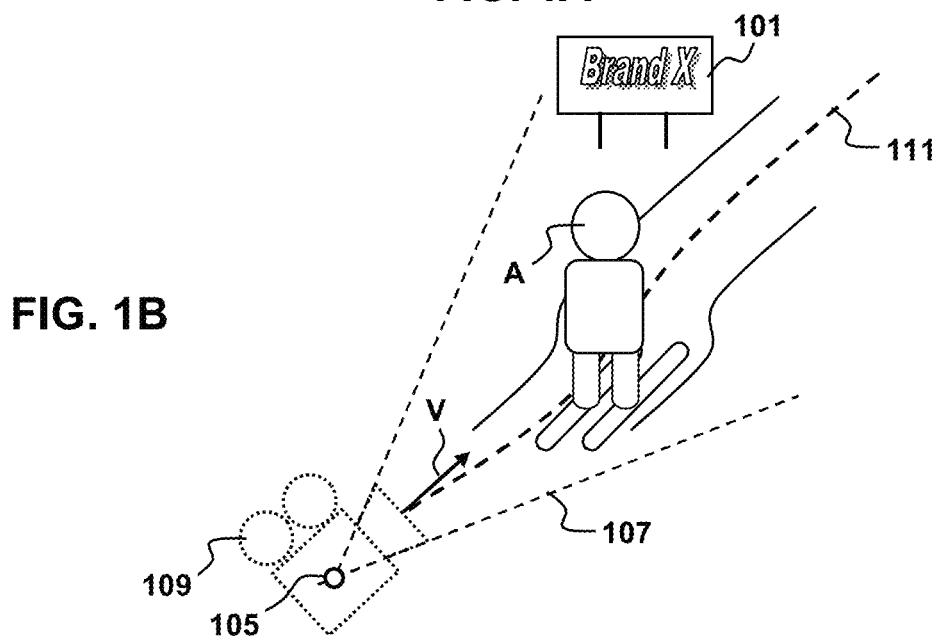
FIG. 1B is a schematic diagram of a simulated environment illustrate containing an advertisement.

The camera management system 174 determines a position within the simulated environment from which the simulated environment is viewed for the purpose of displaying a portion of the simulated environment. The displayed portion of the simulated environment is referred to herein as a "scene" 106. The camera management system 174 may also determine an angle from which the scene is viewed. Furthermore, the camera management system 174 may also determine limits on the width, height and depth of a field-of-view of the portion of the scene. The scene 106 may be thought of as a display of a portion of the simulated environment from a particular point-of-view within the simulated environment. As shown in FIG. 1B, the scene 106 may be displayed from a point-of-view (camera POV) 105 on the video display 104. The scene 106 may encompass that portion of the simulated environment that lies within a frustum 107 with a virtual camera 109 located at a narrow end thereof. The point-of-view 105 is analogous to a position and orientation of a camera photographing a real scene and the frustum 107 is analogous to the field-of-view of the camera as it photographs the scene. Because of the aptness of the analogy, the particular point of view is referred to herein as a camera point-of-view (camera POV) and the frustum 107 is referred to herein as the camera frustum. The camera POV 105 generally includes a location (e.g., x, y, z) of the virtual camera 109 and an orientation (e.g., pitch, roll and yaw angle) of the virtual camera 109. Changing the location or orientation of the virtual camera 109 causes a shift in the scene 106 that is displayed on the video display 104. The camera orientation may include a viewing direction V. The viewing direction V may be defined as a unit vector oriented perpendicular to a center of a narrow face of the camera frustum 107 and pointing into the camera frustum. The viewing direction V may change with a change in the pitch and/or yaw of the virtual camera 109. The viewing direction V may define the "roll" axis of the virtual camera 109.

There are a number of different possible configurations for the camera POV 105 and camera frustum 107. By way of example, and without limitation, the user' may control an avatar A through which the user U may interact with the virtual world. The camera POV 105 may be chosen to show the avatar A within the simulated environment from any suitable angle. Alternatively, the camera POV 105 may be chosen so that the video display 104 presents the scene from the avatar's point of view.

As shown schematically in FIG. 1B, the scene 106 shows that portion of the simulated environment that lies within the frustum 107. The scene 106 may change as the camera POV 105 changes in response to movement of the camera POV 105 along a camera path 111 during the user's interaction with the simulated environment. The camera path 111 may be represented by a set of data values that represent the location (x, y, z) and orientation (yaw, pitch, roll) of the camera POV 105 at a plurality of different time increments during the user's interaction with the simulated environment.

According to embodiments of the present invention movement may be added to the camera path 111 to direct the camera POV 105 toward one or more advertising targets encountered along the camera path. The movement added to the camera path is configured to place the advertising targets 101 within the scene 106 displayed on the video display to increase a likelihood of advertising impressions associated with one or more of the advertising targets 101. There are a number of factors that determine an advertising impression. These factors include, among other things, whether an advertising target 101 falls within the camera frustum 107, how close the advertising target is to the camera POV 105, how long the advertising target remains within the camera frustum 107, whether the user's view of the advertising target is obscured by other objects within the camera frustum 107 and an angle between the view direction V and a vector that is normal (perpendicular) to a surface of the advertising target 101. The software 172 may include an advertising impression calculation routine that takes these and other factors into account in determining whether an advertising impression has been generated as a result of the user's interaction with the simulated environment.

In some simulated environments (e.g., video games) a user may select and/or manipulate objects that are present in the scene. In embodiments of the present invention, when a user selects an object the camera POV 105 may engage in movement toward the selected object other than a straight line movement to the object of interest but may include tilts or pans to capture advertising impressions along the way.

The camera management system 174 may automatically generate a view of the scene 106 within the simulated environment based on the camera path 111. The simulation software 172 may determine the camera path 111 partly in to a state of execution of instructions of the software 172 and partly in response to movement commands initiated by the user U. The user U may initiate such movement commands by way of an interface 114 coupled to the client device 170. The displayed scene 106 may change as the camera POV 105 changes in response to movement of the camera POV 105 and camera frustum 107 along the camera path 111 during the user's interaction with the simulated environment.

In embodiments of the invention, a user's freedom to manipulate the camera point of view 105 may be constrained slightly to increase the likelihood of generating an advertising impression. For example, movement may be added to the camera path 111 independent of user-initiated movement commands or interaction with the simulated environment. Alternatively, movement may be added to the camera path 111 movement may be added to movement of the camera POV 105 resulting from a user-initiated movement commands or other interaction with the simulated environment. The device 170 may include impression enhancement instructions 176 that calculate an amount of movement to be added to the camera path 111 during some interval of time Δt. The impression enhancement instructions 176 may be implemented in hardware, software or some combination of hardware and software.

By way of example, and without limitation, the added movement to the camera path 111 may include a tilt (change in pitch angle) or pan (change in yaw angle) that directs the camera POV 105 toward the one or more advertising targets 101. Furthermore, the movement added to the camera path 111 may include adding a displacement to a location (x, y, z) of the camera POV 105 to the camera path. In addition, a rate of movement of the camera POV 105 may be reduced for a sufficient period of time that an advertising target 101 stays visible to the user long enough to generate an impression. As used herein a "rate of movement" of the camera POV 105 includes an angular speed of tilt, pan or roll of the camera POV as well as a rate of change of position of the camera POV 105 within the simulated environment.

Figure 1C:
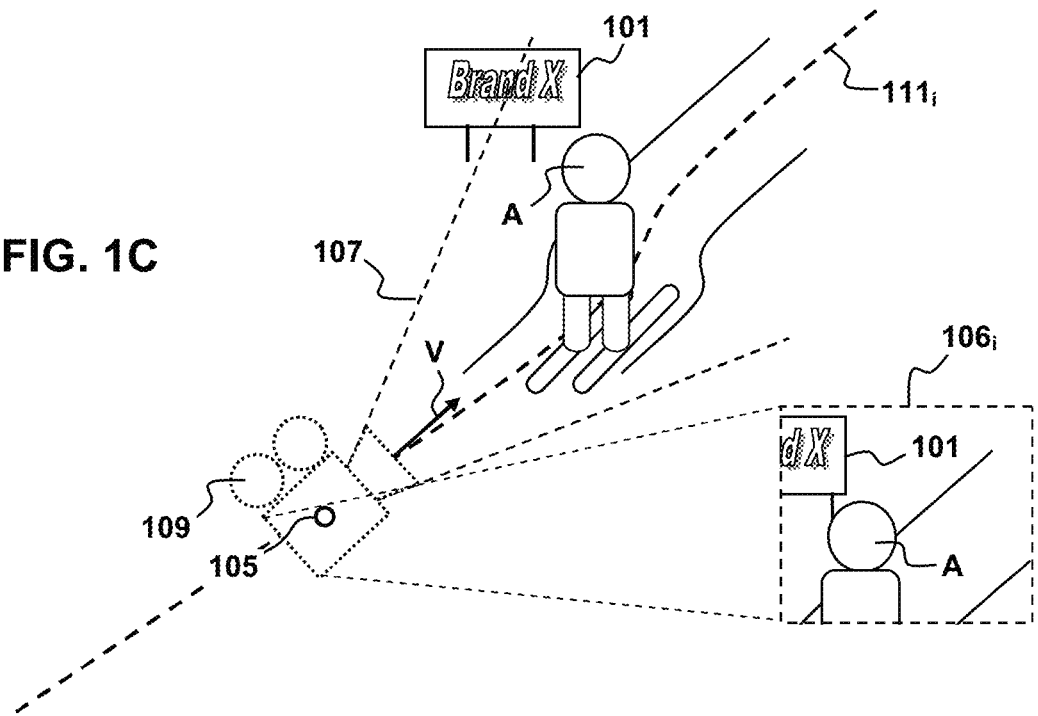
FIG. 1C is a schematic diagram of a simulated environment containing an advertisement illustrating a situation in which an initial camera path misses an advertising impression.
Figure 1D:
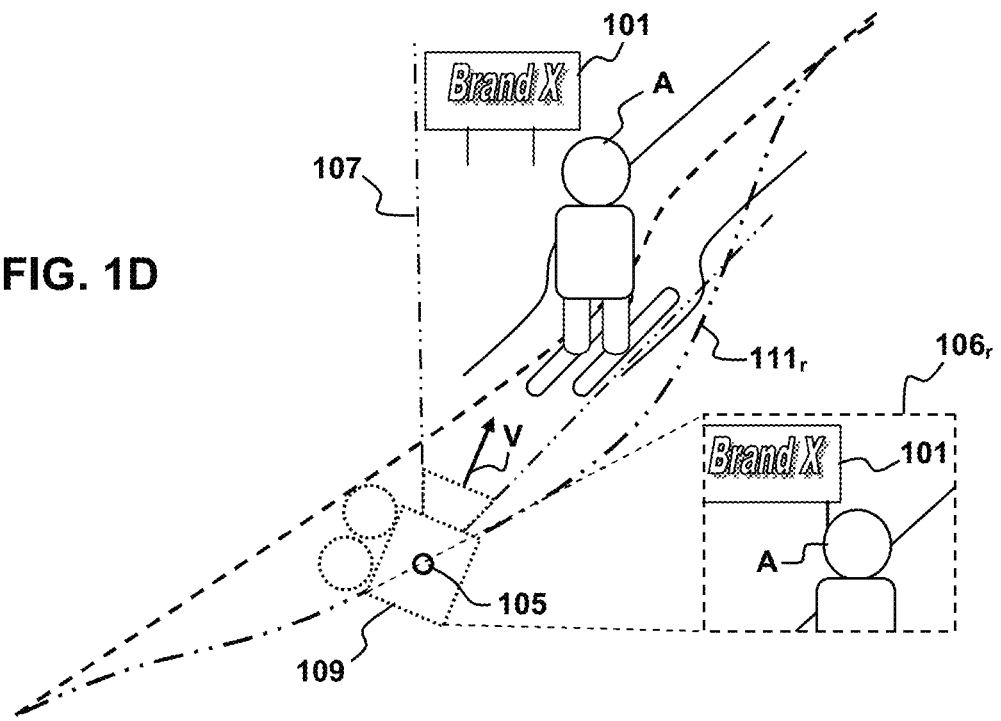
FIG. 1D is a schematic diagram of a simulated environment containing an advertisement illustrating a situation in which in which the initial camera path of FIG. 1C has been revised by shifting a camera location and orientation according to an embodiment of the invention in order to capture an advertising impression that would have been missed had the initial camera path in FIG. 1C been followed.

FIGS. 1C-1D illustrate an example of added camera movement when the camera POV 105 shows the avatar A in the scene 106. In this example, the camera POV 105 is chosen to be slightly behind and to one side of the avatar A. The simulation software 172 and/or impression enhancement instructions 176 may calculate an initial camera path 111$_i$ for a time interval Δt prior to display of the resulting scene during the time interval Δt. The initial camera path 111$_i$ may be determined based on simulation state information including, but not limited to a known size and shape of the camera frustum 107, a current location of the camera POV 105, a current orientation of the camera POV 105, a velocity of the camera POV 105, a rate of change of orientation of the camera POV 105 a location of the avatar A, a velocity of the avatar A, a position and velocity of the advertising target 101, etc. Furthermore, in some embodiments, the user U may be able to control the camera POV 105 through commands issued from the interface 114. Such commands may be taken into account in calculating the initial path 111$_i$ for the time interval Δt. Based on this information, future values of the position and orientation of the camera POV, avatar A and advertising target 101 may be determined by known processes of forward projection. The impression enhancement instructions 176 may analyze these future values to determine if any advertising impressions would be missed during Δt if the initial camera path 111$_i$ were to be followed.

In the example illustrated in FIGS. 1C-1D, the initial camera path 111$_i$ for time interval Δt would place an advertising target 101 only partly within the camera frustum 107. As seen in the inset FIG. 1C, this would result in a scene 106$_i$ that would only partially show the advertising target 101. The impression enhancement instructions 176 may determine that an advertising impression would be missed if the initial camera path 111$_i$. The impression enhancement instructions 176 may add movement to the initial camera path 111$_i$ to produce a revised camera path 111$_r$ for the time interval Δt that places the advertising target 101 fully within the camera frustum 107 under conditions that would lead to an advertising impression. For example, the revised camera path 111$_r$ may place the advertising target 101 fully within the camera frustum 107, at a viewing angle that is within a predetermined acceptable range, and not obscured by any other objects in the scene $106_r$, including the avatar A. The simulation software 172 may then use the revised camera path $111_r$ to generate a scene $106_r$ that is displayed to the user. It is noted that in this example the revised camera path $111_r$ deviates from the initial camera path $111_i$ in terms of both the location and orientation of the camera POV 105.

Figure 1E:
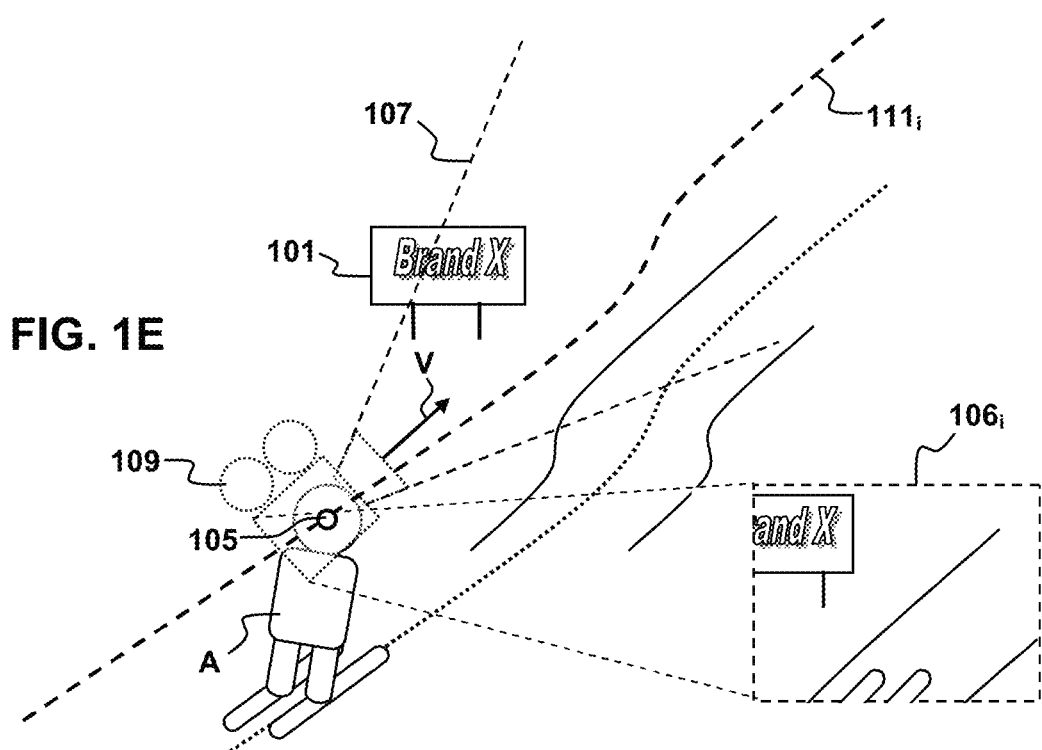
FIG. 1E illustrates a schematic diagram of a simulated environment containing an advertisement illustrating a situation in which an initial camera path misses an advertising impression from an avatar point-of-view.
Figure 1F:
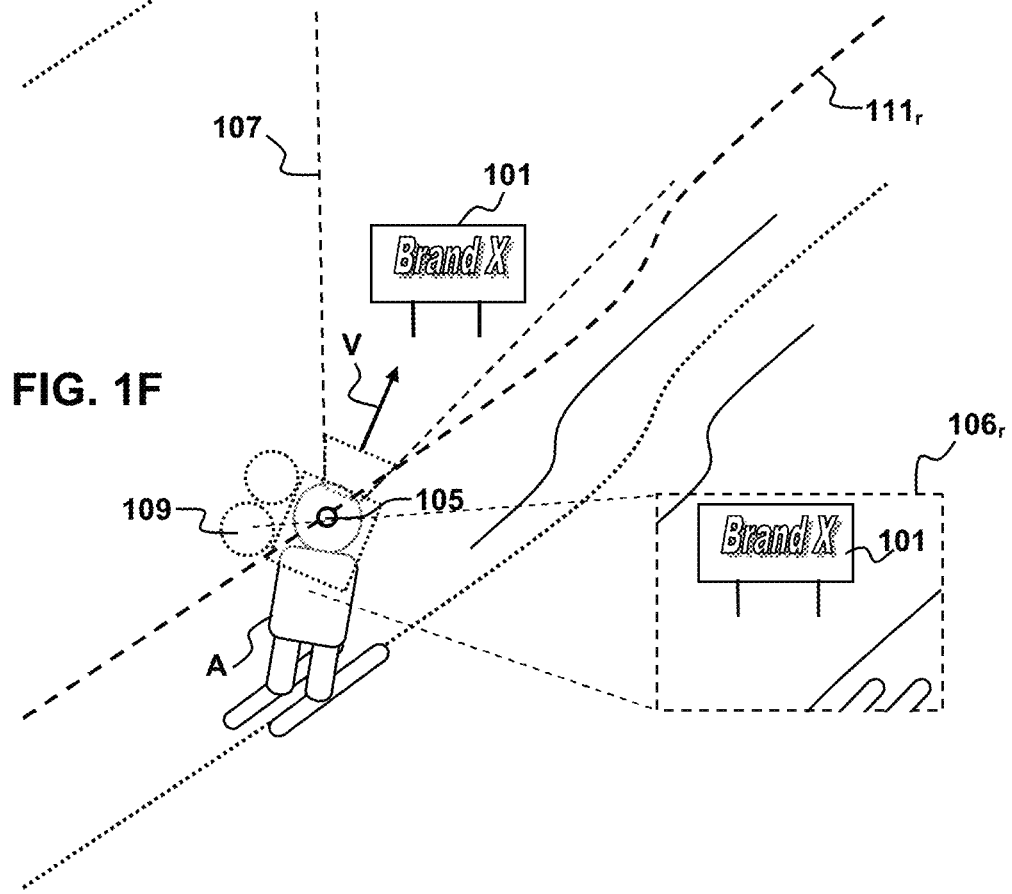
FIG. 1F is a schematic diagram of a simulated environment containing an advertisement illustrating a situation in which in which the initial camera path of FIG. 1E has been revised by shifting a camera orientation according to an embodiment of the invention in order to capture an advertising impression that would have been missed had the initial camera path in FIG. 1E been followed.

In some embodiments, the camera POV 105 may be chosen such that the scene 106 is displayed to the user U from the point of view of the avatar A. FIGS. 1E-1F illustrate an example of added camera movement when the camera POV 105 shows a scene displayed from an avatar's point of view. As seen in FIG. 1F, the location of the camera POV 105 coincides with a location of the avatar A. As may be seen from the inset in FIG. 1F, an initial scene $106_i$ shows part of the simulated environment, but does not show the avatar A. It is noted that in this example, the location of the camera POV 105 along the initial path $111_i$ follows changes in the location of the avatar A during the time interval Δt.

In this example, the initial path $111_i$ would lead to a situation in which an advertising target 101 would not be fully within the camera frustum 107 and therefore would not be fully visible in the initial scene $106_i$ during a time interval Δt. The impression enhancement instructions 176 may add movement to the initial camera path $111_i$ to produce a revised camera path $111_r$ for the time interval Δt that places the advertising target 101 fully within the camera frustum 107 under conditions that would lead to an advertising impression. For example, the revised camera path $111_r$ may change the viewing direction V by an amount sufficient place the advertising target 101 fully within the camera frustum 107, at a viewing angle that is within a predetermined acceptable range, and not obscured by any other objects in the resulting scene $106_r$. The simulation software 172 may then use the revised camera path $111_r$ to generate the scene $106_r$ that is displayed to the user. It is noted that in this example the revised camera path $111_r$ deviates from the initial camera path $111_i$ in terms of the orientation of the camera POV 105 but not in terms of the location of the camera POV 105.

It is noted that the impression enhancement instructions 176 may allow the location of the camera POV 105 may also deviate during the time interval Δt. However, this may result in either changing the path for the avatar A during time interval Δt or changing the location of the camera POV 105 relative to the avatar during the time interval Δt, or some combination of both of these. In some situations like that shown in FIGS. 1E-1F, transient movements may sometimes be added to the avatar A by the simulation software 172 to make the avatar look natural. In certain embodiments of the present invention such transient effects may be applied to the avatar A to move its head in the direction of an advertising target 101. Such transient effects may be applied, e.g., when the avatar A is not moving or is just walking. These transient effects may be configured to add movement to the camera POV 105 in the direction of nearby advertising targets.

Figure 2:
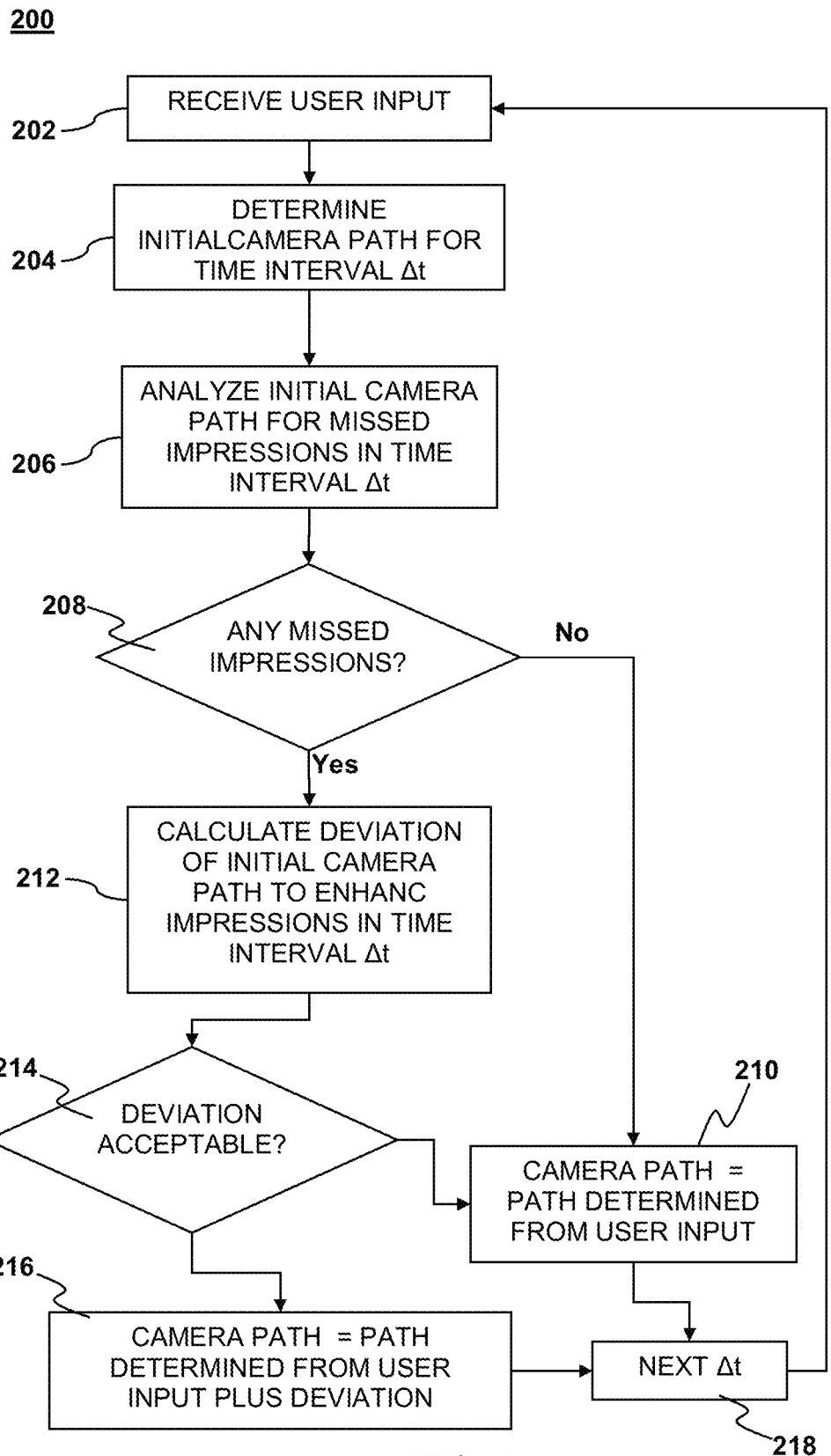
FIG. 2 is a flow diagram depicting an example of adding movement to the camera path that directs a camera point-of-view toward one or more advertising targets encountered along a camera path in a method for enhancing advertising impressions according to an embodiment of the present invention.

There are a number of different ways to determine the amount of movement to add to the camera path 111 in order to direct the camera POV 105 toward one or more advertising targets encountered along the camera path 111. For example, as seen in FIG. 2, a computer implemented routine 200 for adding movement includes determining an initial camera path $111_i$ for a time interval Δt based on user input and/or a state of the interactive environment, as indicated at 202 and 204. As discussed above, such state information may include a location, orientation, velocity and rate of change of orientation of the camera POV 105 at various time instances $t_1 \ldots t_N$ within the time interval Δt. In addition, the state information may include positions and/or velocities and/or rates of change of orientation of objects within the simulated environment, such as an avatar A, advertising targets 101, and other objects. The initial camera path $111_i$ may be analyzed at 206 to determine whether any advertising impressions would be missed for the time interval Δt. Preferably, the time interval Δt is longer than a minimum time necessary to generate an advertising impression. If no missed advertising impressions are identified at 208, the initial camera path $111_i$ may be used for displaying the scene during the time interval Δt as indicated at 210. If missed advertising impressions were identified at 208, then a deviation δ of the camera path from the initial camera path $111_i$ may be calculated as indicated at 212. The deviation δ may be configured to capture an impression that would have been missed if the initial camera path $111_i$ were to be followed during the time interval Δt. For example, the deviation δ may be configured such that the revised camera path $111_r$ places an advertising target 101 within a frame of the video display for a sufficient time and at a sufficient resolution and viewing angle to generate an advertising impression.

By way of example, the deviation δ may be represented by a set of vectors $S_i \ldots \delta_N$. Each vector $\delta_1 \ldots \delta_N$ may be associated with a corresponding one of the time instances $t_1 \ldots t_N$ within the time interval Δt. By way of example, a given vector $\delta_1$ within the set of vectors $\delta_1 \ldots \delta_N$ may include a plurality of components. Each component represents an amount of deviation of a component of the initial camera path $111_i$ at the corresponding time instance $t_j$. For example, the initial camera path $111_i$ may be represented by a plurality of vectors $P_{i1} \ldots P_{iN}$. Each given vector $P_{ij}$ may includes components that describe the location, orientation and rate of change of location and orientation of the camera POV 105 at a corresponding instance of time $t_j$ in the time interval Δt. By way of example and without loss of generality, the components of the vector $P_{ij}$ may include $x_{ij}, y_{ij}, z_{ij}, v_{ijx}, v_{ijy}, v_{ijz}, \theta_{ijyaw}, \theta_{ijpitch}, \theta_{ijroll}, \omega_{ijyaw}, \omega_{ijpitch}$, and $\omega_{ijroll}$, where:

$x_{ij}, y_{ij}, z_{ij}$ are the x, y and z components of the position of the camera POV 105 in the initial camera path $111_i$ at time instance $t_j$;

$v_{ijx}, v_{ijy}, v_{ijz}$ are the x, y, and z components of the velocity of the camera POV 105 in the initial camera path $111_i$ at time instance $t_1$;

$\theta_{ijyaw}, \theta_{ijpitch}, \theta_{ijroll}$ are the yaw, pitch and roll components of the orientation of the camera POV 105 in the initial camera path $111_1$ at time instance $t_j$; and $\omega_{ijyaw}, \omega_{ijpitch}, \omega_{ijroll}$ are the rates of change of the yaw, pitch and roll components of the orientation of the camera POV 105 at time instance $t_j$.

The components of a given deviation vector $\delta_j$ may similarly include $\delta x_j, \delta y_j, \delta z_j, \delta v_{jx}, \delta v_{jy}, \delta v_{jz}, \delta \theta_{jyaw}, \delta \theta_{jpitch}, \delta \theta_{jroll}, \delta \omega_{jyaw}, \delta \omega_{jpitch}$, and $\delta \omega_{jroll}$, where:

$\delta x_j, \delta y_j, \delta z_j$ represent the amount of deviation added to $x_{ij}, y_{ij}, z_{ij}$;

$\delta v_{jx}, \delta v_{jy}, \delta v_{jz}$ represent the amount of deviation added to $v_{ijx}, v_{ijy}, v_{ijz}$;

$\delta \theta_{jyaw}, \delta \theta_{jpitch}, \delta \theta_{jroll}$ represent the amount of deviation added to $\theta_{ijyaw}, \theta_{ijpitch}, \theta_{ijroll}$; and $\delta \omega_{jyaw}, \delta \omega_{jpitch}$, and $\delta \omega_{jroll}$ represent the amount of deviation added to $\omega_{ijyaw}, \omega_{ijpitch}$, and $\omega_{ijroll}$.

The components of the deviations $\delta_1 \ldots \theta_N$ added to the corresponding initial camera path vectors $P_{ij}$ to produce a revised camera path $111_r$, e.g., made up of vectors $P_{r1} \ldots P_{rN}$. By way of example, for each time instance $t_j$, the corresponding $P_{rj} = P_{ij} + \delta_j$.

Missed impressions may be identified, e.g., by analyzing the components of the initial camera path vectors $P_{ij}$ and similar vectors for the advertising targets 101, avatar A and obstacles and identifying a situation in which an advertising target 101 would be at least partly visible in the scene displayed on the video display 104 during the interval $\Delta t$ but not sufficiently visible to generate an advertising impression. For example, an advertising impression may be missed if the advertising target is sufficiently obscured by another object in the displayed scene that an advertising impression would not be generated. Alternatively, an impression might not be generated if the advertising target is not visible in the scene displayed for a sufficient time to generate an advertising impression, Furthermore, an impression might not be generated if the advertising target is visible at too large a viewing angle to generate an advertising impression. As used herein, the term viewing angle refers to an angle between the viewing direction V of the camera POV 105 and a direction normal (i.e., perpendicular) to a surface of an advertising target 101. If this viewing angle is too large, advertising material on the target 101 may not be sufficiently discernible to generate an advertising impression. In addition, an impression might not be generated if the advertising target is visible but with insufficient resolution to generate an advertising impression. This may occur, e.g., if the advertising target 101 is too far away from the camera POV 105. As a result, the advertising target 101 will appear smaller on the video display and there may not be enough pixels in the image of the advertising target 101 for the user U to discern the advertising content. It is noted that an impression might not be generated for some combination of two or more of the foregoing reasons.

Identifying missed impressions may also include identifying a situation in which an advertising target 101 would be outside a frame of the scene 106 displayed on the video display during the time interval $\Delta t$, but is sufficiently close to the camera path that, with a relatively, small deviation of the camera path 111$_i$, the advertising target could be placed in the frame: (a) without being obscured by another object in the scene displayed on the video display to a degree that an advertising impression would not be generated, (b) for a sufficient time to generate an advertising impression, (c) at a viewing angle small enough to generate an advertising impression, and (d) with sufficient resolution to generate an advertising impression. It is noted that an example of a relatively small deviation of the camera path is one that would not cause the scene displayed on the video display to appear nausea-inducing, jarring or unnatural to the user as a result of the deviation.

Furthermore, the deviation $\delta$ from the initial camera path 111$_i$ calculated at 212 may include a shift in a location (x, y, z) of the camera POV 105 and/or a tilt and/or pan angle of the camera POV 105 that would place an advertising target 101 associated with a missed impression within a frame of the scene 106 displayed on the video display 104 (a) without being obscured by another object in the scene displayed on the video display to a degree that an advertising impression would not be generated, (b) for a sufficient time to generate an advertising impression, (c) at a viewing angle small enough to generate an advertising impression, and (d) with sufficient resolution to generate an advertising impression.

It is noted that while it is desirable for the revised camera path 111$_r$ to generate an advertising impression, it is also desirable to avoid detrimentally affecting the user's experience of the simulated environment. For example, in a video game, deviations that take the viewer's attention away from the action taking place within the context of the game may annoy some users. Furthermore, certain deviations may alter the displayed scene in an unnatural manner, e.g., too rapidly or in unexpected directions. Such deviations may degrade the user's experience of the simulated environment. Users may find such deviations to be nausea-inducing, jarring or unnatural.

The components of the deviations $\delta_1 \ldots \delta_N$ may be limited in a manner calculated to avoid displaying the scene in way that would appear nausea-inducing, jarring or unnatural to the user. By way of example, limits may be placed on the total amount of deviation in the position (x, y, z) and/or orientation ($\theta_{yaw}$, $\theta_{pitch}$, $\theta_{roll}$) that may take place over the course of the time interval $\Delta t$. In addition, limits may be placed on the values of the velocity ($v_x$, $v_y$, $v_z$) and rate of change of orientation ($\omega_{yaw}$, $\omega_{pitch}$, $\omega_{roll}$) for any given time instance $t_j$ within the time interval $\Delta t$. Such limits may be determined empirically through experimentation during development of a game title. Avoiding nausea-inducing, jarring, or unnatural camera movements may take on other forms. For example, in the case illustrated in FIGS. 1C-1D the impression enhancement instructions 176 may take into account the fact that the avatar A should also be displayed in the scene 106$_r$ in order to avoid an unnatural movement in the scene 106$_r$. Thus, the position and movement of the avatar A may be taken into account in restricting the amount of movement that may be added to the initial camera path 111$_i$ so that the avatar A remains within the frame of the scene displayed.

The deviation $\delta$ may be analyzed at 214 to determine whether displaying the scene 106 according to the revised camera path 111$_r$ during the time interval $\Delta t$ would cause the scene to appear nausea-inducing, jarring or unnatural to the user if displayed on the video display 104. As indicated at 216, the scene may be displayed according to the revised camera path 111$_r$ during the time interval $\Delta t$ if it is determined at 214 that displaying the scene according to the revised camera path during the time interval $\Delta t$ would not cause the scene displayed on the video display to appear nausea-inducing, jarring or unnatural to the user. The scene may be displayed according to the initial camera path 111$_i$ during the time interval $\Delta t$ if it is determined that displaying the scene according to the revised camera path 111$_r$ during the time interval $\Delta t$ would cause the scene to appear nausea-inducing, jarring or unnatural to the user U as displayed on the video display 104.

After the camera path for the interval $\Delta t$ has been established, the camera management system 174 may use the camera path to determine the scene 106 that is displayed on the video display 104. During this time, the camera path for a subsequent time interval $\Delta t$ may be determined as indicated at 218.

The degree to which the camera path 111 deviates in response to the presence of advertising targets may be based on such factors as proximity of the camera frustum 107 to an advertising target 101, the relative velocity between the camera frustum 107 and advertising target, the view direction V and the direction of the normal to the surface of the advertising target 101. By way of example, a field of attraction may be associated with an advertising target 101. The field of attraction may be used to determine the deviation $\delta$ applied to the initial path 111$_i$. In one embodiment the field of attraction may be configured to direct the camera POV 105 to point toward an advertising target 101 as the camera frustum 107 passes close to the advertising target. The field of attraction may be configured such that the resulting attraction of the camera frustum is non-uniform. For example, the field of attraction for an asset may be configured to more strongly attract the camera frustum in situations where the asset lies just outside the camera frustum and not attract at all if the camera frustum is heading away from the asset, or a deviation toward the asset would not produce an impression. For example, a deviation that would result in viewing the asset at highly oblique angle might not generate an impression.

Figure 3:
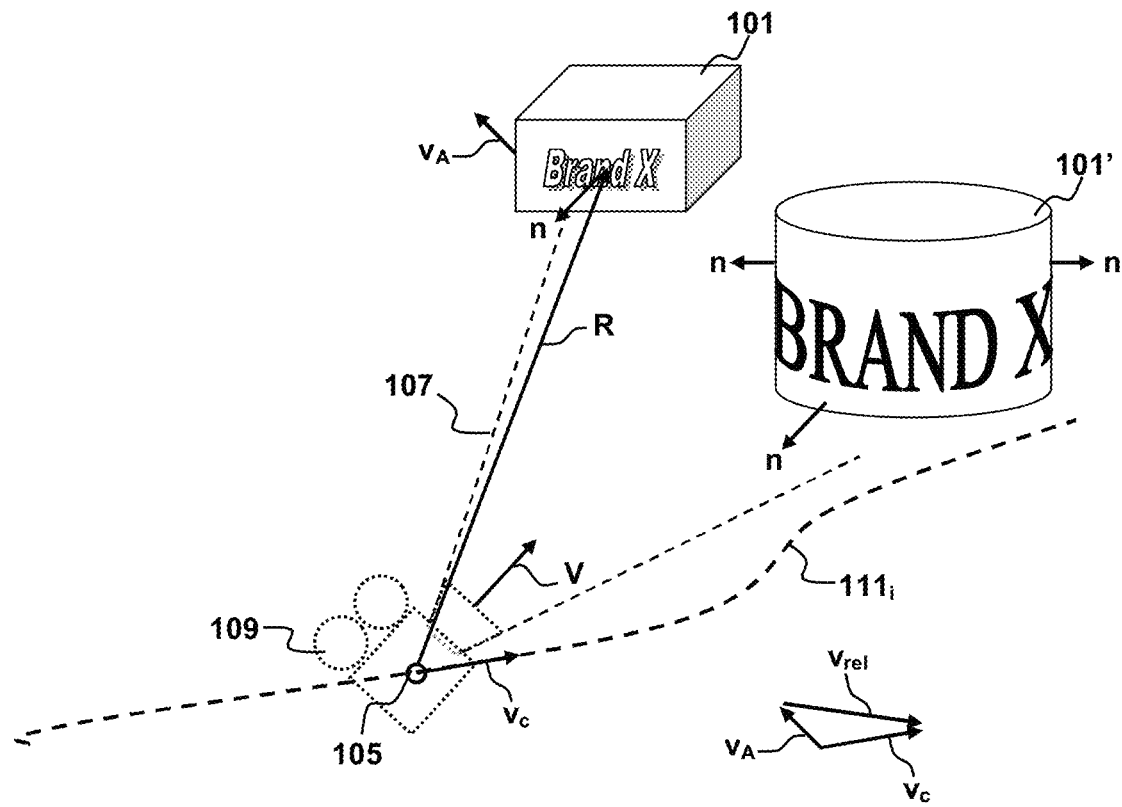
FIG. 3 is a vector diagram illustrating an example of a situation in which an attraction strength is associated with an advertising target according to an embodiment of the present invention.

The field of attraction of an asset may be customized to the angle of approach and speed of approach of the camera frustum. In some embodiments, the camera frustum may slow down slightly to generate an impression. For example, as seen in FIG. 3 the field attraction of an advertising target 101 may be understood in terms of a relative displacement vector R between the camera POV 105 and the target 101, the unit viewing direction vector V, a normal unit vector n associated with the target 101, a velocity vector v of the camera POV 105, and a relative velocity vector $v_{rel}$. The relative displacement vector R has a magnitude determined from a distance R between the camera POV 105 and a center of the advertising target 101. The direction of the relative displacement vector R is a unit vector r along a line through the camera POV 105 and the center of the advertising target 101 pointing from the camera POV 105 toward the advertising target 101. The normal unit vector n is oriented perpendicular to a surface of the advertising target 101. The relative velocity vector $v_{rel}$ has a magnitude equal to a time rate of change of the distance R and a direction determined from the rate of change of the relative displacement vector R. Alternatively, the relative velocity may be determined from a vector difference between the camera velocity $v_c$ and a velocity $v_A$ of the advertising target 101, e.g., $v_{rel}=v_c-v_A$. It is noted that the direction of the normal unit vector n may be different for different points on the surface of the target 101 if the surface is not flat, e.g., as shown for the cylindrical advertising target 101'.

By way of example, an optimum situation for generating an advertising impression may be one in which, among other things, the view direction V the camera POV velocity vector v, the relative displacement vector R, and the relative velocity vector $v_{rel}$ are all aligned with each other and are 180 degrees opposite the normal vector n. It is noted that in such a an ideal situation, the dot products of unit vectors representing the directions of V, R, $v_c$ and $v_{rel}$ with respect to each other are all equal to one and dot products of such unit vectors with the normal unity vector n are all equal to minus one. Thus, the strength of attraction of the target 101 for the camera frustum 107 may be based on the dot products of these unit vectors and an attraction strength S associated with each advertising target 101. In particular, the deviation calculation 212 may iteratively attempt to determine values of the deviation vectors $\delta_1 \ldots \delta_N$ that make the dot products of the unit vectors representing the directions of V, R, v and $v_{rel}$ with respect to each other as close to one as possible during the interval $\Delta t$. Furthermore the deviation calculation 212 may iteratively attempt to determine values of the deviation vectors $\delta_1 \ldots \delta_N$ that make the dot products of the unit vectors representing the directions of V, R, $v_c$ and $v_{rel}$ with respect to the unit normal vector n other as close to minus one as possible during the interval $\Delta t$.

The dot products may be used as part of the process of determining whether a calculated deviation $\delta$ would be acceptable at 214. For example, if the dot product between the view direction V and the unit normal n is zero, the view direction is at right angles to the normal n. In such a situation, any deviation that would tend to point the camera POV 105 toward the advertising target to capture an impression might be so abrupt and so large as to be jarring, nausea-inducing or unnatural. Furthermore, if the dot product between the viewing direction V and the relative displacement vector R is negative and the dot product between the camera POV velocity $v_c$ and the relative displacement vector R is negative it may be deduced that the camera POV is pointing away from and moving away from the target 101. In such a situation, any deviation that would tend to point the camera POV 105 toward the advertising target to capture an impression might be so abrupt as to be jarring, nausea-inducting or unnatural.

In embodiments of the present invention, the value of the deviation vectors $\delta_1 \ldots \delta_N$ may be determined by applying weights to the dot products and attempting to optimize the resulting weighted dot products. The weights may be based on an attraction strength S associated with the advertising target 101. The weights may take into account numerous factors associated with generating an advertising impression. For example, the weights may all be set to zero if the distance R is either too large or too small for an impression to be generated. The weights may be set closer to one if the distance R is in within some optimum range for which relatively small deviations can make a difference between generating an advertising impression or not. The values of the weights may also depend on the values of the dot product so that strength of deviation tends to weaken with large viewing direction V and the normal n and/or large angles between R and $v_{rel}$. In certain embodiments, the strength of the field of attraction, e.g., the values of the weights, may be sold as part of the cost of placing the ad asset in the simulated environment. For example, in an extreme case, the weights may all be set to zero so that all $\delta_1 \ldots \delta_N=0$, if the weights are not paid for.

Figure 4:
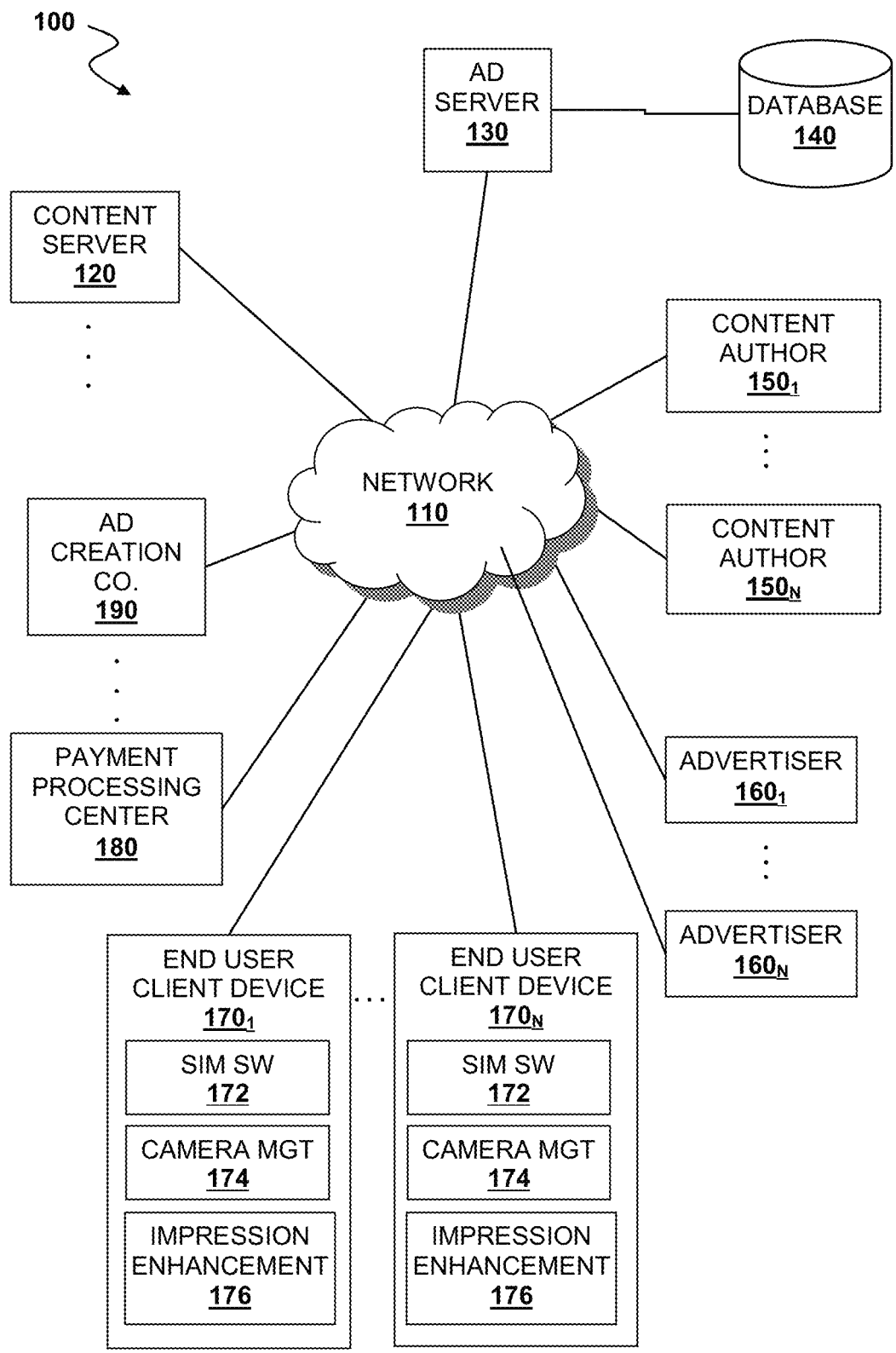
FIG. 4 illustrates an example an advertising system for a simulated environment as may be utilized in an embodiment of the present invention.

Advertising impressions associated with one or more of the advertising targets 101 during the user's interaction with the simulated environment may be recorded and a number of advertising impressions recorded during the user's interaction with the simulated environment may be reported to a reporting server as part of an advertising system associated with the simulated environment. FIG. 4 illustrates an example of in-game advertising system 100 as may be utilized in association with embodiments of the present invention. The in-game advertising system 100 of FIG. 4 comprises a network 110. The Network 110 may be, for example, a cable television network, a broadband wireless network or on optical fiber network. Embodiments of the present invention do not impose any limitation with regard to the particular type of communication medium(s), whether the network is homogeneous (e.g., end-to-end wireless) or whether the network is proprietary, open or a combination of the two. The network 110 only need provide the means to communicate amongst the various servers and/or terminals coupled to the network 110 and make up the advertising system 100 of an embodiment of the present invention. The network 110 may be a communications network, a data network or a combination of the two. The network 110 may be a local area network or wide area network such as the Internet. The network 110 may be implemented, e.g., using an infrastructure, such as that used for CATV bi-directional networks, ISDN or xDSL high speed networks to enable network connections for implementing certain embodiments of the present invention.

As shown in FIG. 4, a content server 120 is communicatively coupled to the network 110. The content server 120 may provide content for a simulated environment as offered by a content provider. An advertising server 130 as offered by an advertising agency is also communicatively coupled to the network 110. The advertising server 130 may comprise or be coupled to an advertising database 140 containing advertisement information data. In the example illustrated in FIG. 4, the system 100 may further comprises content authors $150_1 \ldots 150_N$, advertisers $160_1 \ldots 160_N$, and end-user client devices $170_1 \ldots 170_N$. Some embodiments of the system 100 may further comprise a payment processing center 180 and an advertising content creator 190.

The content server 120 may distribute digital content for a simulated environment. By way of example, and without loss of generality, content may be requested from networked devices operating in a gaming network. In one embodiment, the content may be requested by end-user client devices $170_1 \ldots 170_N$. The content distributed by content server 120 may comprise video game content (e.g., actual video games, or portions thereof, accessed by end-user client devices $170_1 \ldots 170_N$) as well as other forms of digital media (e.g., music and video). The content server 120 may further provide for the storage of digital content. The content server 120 may store such content locally (e.g., as part of a storage area network) or at a location physically remote from the content server 120 but otherwise communicatively coupled to the server 120 thereby allowing for retrieval and transmission of the content to end-user client devices $170_1 \ldots 170_N$. Content served by the content server 120 may be served as the result of a push or pull operation.

The advertising server 130, as previously noted, may be managed by an advertising agency providing for the distribution of advertising content to larger audiences (e.g., end-users). The advertising server 130 may serve audio, video, audio/video and still image content. Content served by the advertising server 130 may be served as the result of a push or pull transaction. The advertising database 140 is a repository for advertising content such as the aforementioned video and audio content. Such content may be stored in digital or analog form. While advertising images are the most prevalent type of advertising content, advertising content may further comprise element types such as programs, objects, state data, control data, textures, bitmap images, compressed images, sequencing data, authentication data, public key and private key. The advertising database 140 may be integrated with the advertising server 130 or may be physically remote from the advertising server 130 but is otherwise configured to provide communicative coupling that allows for the retrieval of content from the database 140 for subsequent transmission to end-user client devices $170_1 \ldots 170_N$, e.g., via the network 110.

Content authors $150_1 \ldots 150_N$ are those entities that develop content for distribution to end-users, for example, video games. Content authors $150_1 \ldots 150_N$ may also develop audio, video and/or audio/video content. Content developed by content authors $150_1 \ldots 150_N$ may be generated in any form of media. For example, content may be developed in an optical disk format or in non-volatile memory such as a flash card. Content may also be provided in a pure data format to be transmitted and hosted by another party. For example, content author $150_1 \ldots 150_N$ may develop a video game but never commercially distribute the content in a physical form of media. Instead, the content may be FTP'd or otherwise transmitted to content server 120 and stored in an appropriate storage means for subsequent delivery to end-user client devices $170_1 \ldots 170_N$.

Advertisers $160_1 \ldots 160_N$ may be any entity seeking to place an advertisement in the digital content created by any of the content authors $150_1 \ldots 150_N$. An advertiser may be from any field of endeavor and need not necessarily be in the entertainment or video game industry.

The end-user client devices $170_1 \ldots 170_N$ are those devices allowing an end-user to access digital content. For example, in the case of a video game, the appropriate end-user client device $170_1 \ldots 170_N$ may include one or more home entertainment video game systems such as a PlayStation3 from Sony Computer Entertainment Inc. In the instance of digital content being, for example, an on-demand movie or other video program, the end-user client devices $170_1 \ldots 170_N$ may include one or more set-top cable boxes. The end-user client devices $170_1 \ldots 170_N$ may include a portable device that may be temporarily coupled to a more permanent device (e.g., a desktop computer) to allow for the transfer or updating of digital content via a USB cable as would be the case in, for example, a portable music device such as an MP3 player. Each client device $170_1 \ldots 170_N$ may include simulation software 172 such as video games developed by one or more of the content authors $170_1 \ldots 170_N$. The simulation software may include an impression enhancement instructions 176 that calculate an amount of movement to be added to the camera path 111 during some interval of time $\Delta t$ to enhance advertising impressions as described above.

The optional payment processing center 180 is configured to allow for the execution of various payment and/or monetary transfer transactions. These payments may be achieved, for example, through direct deposit, automatic funds or wire transfers as is appropriate and/or available. The payment processing center 180 may, for example, be associated with a bank offering these services. In another example, the payment processing center 180 may be associated with an on-line escrow agent communicatively coupled to a variety of banks wherein the escrow agent instructs and/or receives notice of various monetary transactions on behalf of various entities in the in-game advertising system 100 (e.g., advertisers $160_1 \ldots 160_N$ and content authors $150_1 \ldots 150_N$).

The advertising content creator 190 is an entity that authors and/or develops advertisements on behalf of advertisers $160_1 \ldots 160_N$ for placement into digital content. In some instances, the advertising content creator 190 may only digitally author content. For example, certain advertising copy (be it audio, video, print or any combination of the three) may have already been created in a non-digital format. In those instances, advertising content creator 190 may manipulate (e.g., digitize) the advertising copy so that it may be placed into the greater context of digital content that is offered by the content server 120. In other instances, advertising content creator may take a script for an advertisement and create the same (e.g., film video, record audio and then combine the two with various special effects). Advertising content creator 190 may also utilize program objects and program scripts including commands related to special effects, program elements, control signals, messaging and various protocols. In still other instances, advertising content creator may develop advertisement campaigns from scratch (e.g., the advertising concept for a campaign) and subsequently create the ad content to correspond to that campaign.

Figure 5:
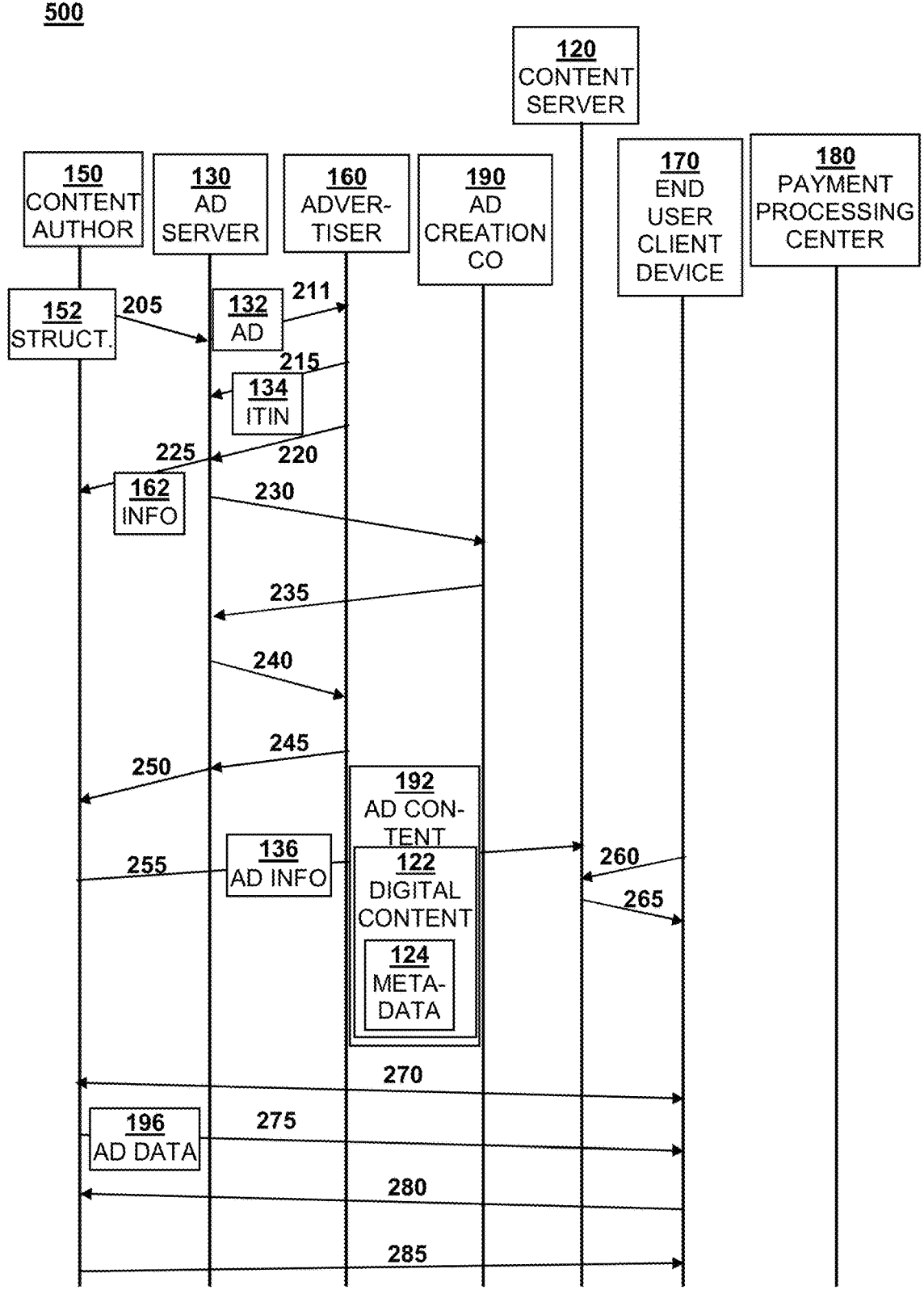
FIG. 5 illustrates an example of communication flow between components of the advertising system depicted in FIG. 4

FIG. 5 illustrates an example of flow of communication 500 among the components of the advertising system 100. For the purpose of example, a single content author 150, advertiser 160 and end user 170 are shown in FIG. 5. Those of skill in the art will recognize that the communication flow 500 depicted in FIG. 5 may be extended to situations having plural content authors, advertisers and end users. A content author 150 provides the advertising server 130 with advertisement structure information 152 in step 205. The content and makeup of the advertisement structure information is discussed in the context of FIG. 4 of US Patent Application Publication 20070079331, which has been incorporated herein by reference. The advertisement structure information may be registered in the advertising database 140 of the advertisement server 130. The operator of the advertisement server 130 informs an advertiser 160 of advertisement information 132 such as title, contents, etc., of a newly-registered game title or other simulated environment asset in informing step 211. Informing of the advertiser 160 may occur by traditional mail, electronic mail, listservs, SMS, instant messenger, chat or any other available communication medium.

At this stage, the ad server 130 may offer and the advertiser 160 may accept the option of an advertising impression enhancement feature as described above with respect to the impression enhancement instructions 176. In particular, the advertisement information 132 may include information regarding whether, how, and how strongly a user's view of a simulated environment generated with the digital contents will be influenced by the presence of assets associated with advertisement content in that simulated environment. The advertisement information 132 may include a price structure for enabling the advertising impression enhancement instructions for advertising content that the advertiser 160 wishes to place within the simulated environment.

The advertiser 160 may access the advertisement server 130 and may view the advertisement information 132 in viewing step 215 and further apply for an advertisement buy from, for example, a web-browser screen in application step 220. Once the advertiser 160 has been established, advertiser specified information 162 such as advertiser name, time slot, and time period of an advertisement are provided to an appropriate content author 150 from the advertisement server 130 in notification step 225. Notification may occur by traditional mail, electronic mail, listservs, SMS, instant messenger, chat or any other available communication medium.

The advertiser specified information 162 and advertisement structure information 152 may also be supplied to the advertisement content creator 190 via the advertisement server 130 in ordering step 230. The advertisement content creator 190 creates advertisement content 192 (e.g., the advertisement) based on the advertiser specified information and advertisement structure information. Completed advertisement content 192 such as bitmap data or other graphic, audio and/or video data may be delivered by the advertisement content creator 190 to the advertisement server 130 in delivery step 235.

Notification of the receipt of the completed advertisement is communicated by the advertisement server 130 to the advertiser 160 in completion step 240 by traditional mail, electronic mail, listservs, SMS, instant messenger, chat or any other available communication medium.

The advertiser 160 may view the completed advertisement information 192 on the advertisement server 130 in viewing/approval step 245. If the advertiser 160 approves of the completed advertisement content 192 corresponding to the completed advertisement information (e.g., by pressing an 'OK' button in a web-interface), the advertisement content is confirmed and an itinerary 134 may be sent by the advertisement server 130 to the content author 150 by traditional mail, electronic mail, listservs, SMS, instant messenger, chat or any other available communication medium in delivery detail confirmation step 250. The itinerary 134 delivered in step 250 may comprise information related to the advertiser, time slot, period, advertising fees and so forth. In embodiments of the invention, the itinerary 134 may include information regarding whether, how, and how strongly a user's view of a simulated environment generated with the digital contents will be influenced by the presence of assets associated with the advertisement content 192 in that simulated environment.

In registration step 255, the content provider 120 may correlate certain advertising information 136 and advertisement content 192 with digital content 122 to be delivered. That is, the content provider 120 recognizes that particular advertisements are to be delivered with particular portions of digital content and so forth. This correlation of information may comprise authoring new derivative files reflecting both advertisement information and digital content/advertising programs), the embedding of metadata 124 in the digital content 122 or the implementation of object oriented programming wherein certain data files (e.g., digital contents/advertising programs) call upon other distinct files (e.g., advertising information 136).

The metadata 124 may also comprise information as it pertains to advertising information 136 such as how long a game character must be present within an impression area defined within the video game. The metadata 124 may further provide information defining the parameters of the impression area and certain quality factors as are discussed herein. Tracking parameters and feedback information and/or instructions may further be imbedded in the metadata of an advertisement. Such information may also be contemporaneously downloaded with the advertising information 136 as a separate file whereby the advertising information calls upon certain information related to impressions, reporting and so forth.

A user accesses and/or requests digital content 122 for a simulated environment (e.g., a driving simulation video game) using an end-user client device 170 in content application step 260. As a result of the application for content, the user may start to download the digital content 122 in download step 265. Alternatively, if the user already has a particular portion of the digital content 122, this step may involve presenting the user with an update as to that content. This step may also comprise unlocking digital content that is already in possession of the user. Step 265 may also involve authenticating removable media, accommodating registration with a game network or a game 'lobby' or ' waiting room' and so forth In some embodiments of the present invention, the user may access digital content using permanent physical media (e.g., an optical disc). The physical media may have embodied thereon instruction for accessing the present advertising system 100 as it pertains specifically to advertising content versus actual simulated environment data, e.g., video game data. In additional embodiments of the present invention, the user may access a combination of advertising content and actual simulated environment data via the system 100 (e.g., new advertising content and new game levels published after the initial release of the game on physical media). Such embodiments are discussed in further detail below.

During the download of content and/or advertisements in step 265, the content provider 120 notifies the advertisement server 130 of the download request as it relates to particular advertising material in step 270, such correlations between content and advertising having previously been made in registration step 255. The advertisement server 130 then transmits the necessary advertisement data 196 corresponding to the user download to the content provider 120 in step 275. If necessary, the advertising data 196 provided to content provider 120 can be updated over time relative the content being downloaded (e.g., new ad copy). In embodiments of the present invention, the advertising data 196 includes information pertaining to whether, in what manner, and how strongly a user's view of a simulated environment generated with the digital content 122 will be influenced by the presence of assets associated with the advertisement content 192 in that simulated environment.

After downloading the digital contents (including advertisement information or content in ad information delivery step 275), the user (through end-user client device 170) renders the advertisement content 192 within the simulated environment associated with the digital content 122, the advertisement information having been provided via advertisement server 130. As noted above, some embodiments of the present invention may access solely advertising information or a combination of new simulated environment content and advertising information rather than an entire game.

During the user's interaction with the simulated environment via the end-user client device 170, the user's view of the simulated environment may be subtly influenced by the presence of advertisement content 192. This subtle alteration is designed to slightly shift the user's view of the simulated environment so that advertising impressions are enhanced, e.g., as described above.

The state of the advertisement, such as the number of distributions or impressions made, may be provided to the advertisement server 130 and, if necessary or desired, to the advertiser 160 in advertisement status notification step 280 so that certain determinations made be made, for example, the success of an ad campaign with regard to the number of impressions made.

As a result of the notification in step 270, the advertisement server 130 may track the advertisements that have been or are being downloaded to the end-user client device 170. Utilizing certain advertising impression and tracking methodologies as discussed in US Published patent application 20070079331, the advertisement server 130 may receive feedback in connection with advertisement impressions. Information concerning impressions or other advertisement feedback may be generated at the end-user client device 170, which may be configured with the necessary software to either directly or indirectly implement impression tracking.

Direct impression tracking may be based on software configured at the end-user client device 170 and that operates in conjunction with a simulated environment kernel and is further configured to participate in network communications such that textures and objects or indexes to textures and objects related to an advertising campaign may be received. The tracking software may directly monitor the angle and position of various advertising asserts with respect to changing camera perspectives presented to the user who controls the camera perspective utilizing a game controller. Indirect impression tracking may occur through a server or a session master client in a peer-to-peer network participating, facilitating, arbitrating or interrogating functions associated with the campaign program (e.g., extraction of data necessary to yield the determination of an ad impression). Hence, ad impression determinations may occur at, for example, ad server 130 or advertiser 160 in response to information generated or signals sent from the end-user client device 170.

Ad impression data may be batched or transmitted over the network at periodic intervals. Transmission of impression data may occur in accordance with a schedule or in conjunction with other processes or transmissions used to facilitate game play or other interaction with the simulated environment. Impression data may also be streamed or pulled during an inquiry received over the network. Any network element of the advertising system 100 may facilitate or influence the transmission of impression data.

Advertisement impressions may be calculated in various ways. For example, an advertisement located in a virtual kiosk in a virtual shopping center might be viewed by 1,000 gamers over the course of an afternoon. It could be said that the particular advertisement enjoyed 1,000 impressions as each gamer walked their gaming character past the kiosk and viewed the goods or services advertised therein. Impressions may also be calculated through a time threshold index. For example, an impression may be earned, triggered, counted or computed after a user has been exposed to the advertisement for a particular period of time. For example, an impression may occur after 30 seconds of exposure by the user to an advertisement. The impression may also be tracked and computed based on one or more user's continuous or distributed exposures to the advertisement on the virtual kiosk or as part of an overall ad campaign.

The advertisement content receiving, impression tracking and impression data feedback transmission systems of the present invention may reside in a single software element or in multiple software elements. Software elements may be distributed in whole, or part, on one or more processors or across a local or wide area network.

Impression enhancing software and impression tracking software may be provided as a result of downloading a necessary software module during download step 265 or the software having been installed directly on physical media (e.g. an optical disk) read by the end-user client device 170 or, alternatively, installed directly in the end-user client device 170. Impression enhancement or impression tracking software or various components of the software may also be installed in the various other components of the advertising system 100 dependent upon the particular configuration of an embodiment.

Similar or identical advertisement state information may be provided to content author 150. This notification is made so that the advertiser 160 may be properly invoiced by the contents author 150 in accordance with any number of payment plans as are discussed herein. The advertisement server 130 may further provide this information to payment processing center 180 to allow for automatic billing and payment in step 285. These payments may be achieved, for example, through direct deposit, automatic funds or wire transfers or any other money transfer methodology as is appropriate and/or available.

The advertising system 100 as described with respect to FIG. 4 may be implemented over various communication and data networks.

It should be noted that in some embodiments of the present invention, certain elements of the in-game advertising system 100 may be combined or removed from the system 100 entirely without compromising the operations of the system 100. For example, an embodiment of the in-game advertising system 100 as described herein may function without the need for a payment processing center 180 as proper remuneration of parties in the system 100 may have been established beforehand or subject to analysis of certain information after advertisement delivery. Similarly, the ad server 130 and related database 140 may be operated in conjunction with the advertisement content creator 190 or with content provider 120. Various approval and notification steps may also be omitted in the course of FIG. 4 so long as ad buys remain reserved, as is discussed in the context of tagging with respect to FIG. 3 of U.S. Patent Application publication 20070079331, which has been incorporated herein by reference, and the proper advertisements delivered relative those tagged assets. Additionally, exchanges of data or various notifications described above may be of a dual-direction or exchanged between various components of system 100. For example, various notifications may be delivered to the ad server 130 in addition by the ad server 130. In that regard, the present invention is not meant to be limited by the exemplary data flows as depicted in FIG. 5.

While FIGS. 4 and 5 illustrate an in-game advertising system 100 wherein content and advertising were both provided to an end-user client device 170 over the network 110, in some embodiments, a user may play a game as embodied on a physical media such as an optical disk as may be utilized in, for example, a PlayStation3 gaming console or for use in a desktop computer (e.g., to be inserted into a CD-ROM drive). In these instances, various libraries related to the game (e.g., character generation, user interfaces, recognition of user controls and so forth) may be authored and stamped directly onto the physical media instead of accessed or downloaded via content provider 120.

In such an embodiment, advertising content may be embodied on the physical media as well. As has been previously noted, however, such advertising schemes may be ineffective if the popularity of a game turns out to be overrated (wherein an ad buy was likely overpriced) or underrated (wherein an ad buy was likely underpriced). Similarly, the relevance of certain advertisements may expire over the course of time (e.g., an advertised event occurs, the advertiser stops selling the product or goes out of business or the advertisements are mock advertisements pertaining to a fictitious product but remain relevant in the context of the game despite the passage of time).

In such physical media, a software client may be embodied in the physical media, the software client comprising operating routines, resources, instructions and so forth that allow an end-user client device 170 reading the optical media or other physical media to access the advertising system 100. Although the user may not necessarily be receiving simulated environment content (e.g., if the user does not download or directly access code and other information related to the actual game), the user may still receive advertising content as the client pertains to the instructions and operations necessary to access the advertising system 100 and for advertising content to be provided to the system 100.

Through the provision of such a software client on physical media, a variety of parties may develop games or other simulated environment content that operates on a particular end-user client device to interact with the advertising system 100. Access to the advertising client code may be subject to a fee charged by an operator of the advertising system 100, the costs of which may be recouped by the third-party game developer who passes those costs on to advertisers $160_1 \ldots 160_N$ that might wish to place content in a particular video game as the popularity and advertising value of that game is assessed.

By way of example, and without limitation, the end user client devices 170 may be game consoles. Examples of commercially game consoles include the Xbox® from Microsoft Corporation of Redmond Wash., the Wii® from Nintendo Company, Ltd of Kyoto, Japan and PlayStation® devices, such as the PlayStation3 from Sony Computer Entertainment of Tokyo, Japan. Xbox® is a registered trademark of Microsoft Corporation of Redmond, Wash. PlayStation® is a registered trademark of Kabushiki Kaisha Sony Computer Entertainment of Tokyo, Japan. Wii® is a registered trademark of Nintendo Company, Ltd of Kyoto, Japan. Such game consoles are commonly coupled to a television set or video monitor so that visual images of the virtual world may be presented to a user. Alternatively the client devices may be any other type of network capable device that can receive and use auxiliary content. Such devices include, but are not limited to cellular telephones, personal computers, laptop computers, television set-top boxes, portable internet access devices, portable email devices, portable video game devices; personal digital assistants, digital music players and the like. Furthermore, the client devices 170 may incorporate the functions of two or more of the devices in the examples previously listed.

Figure 6:
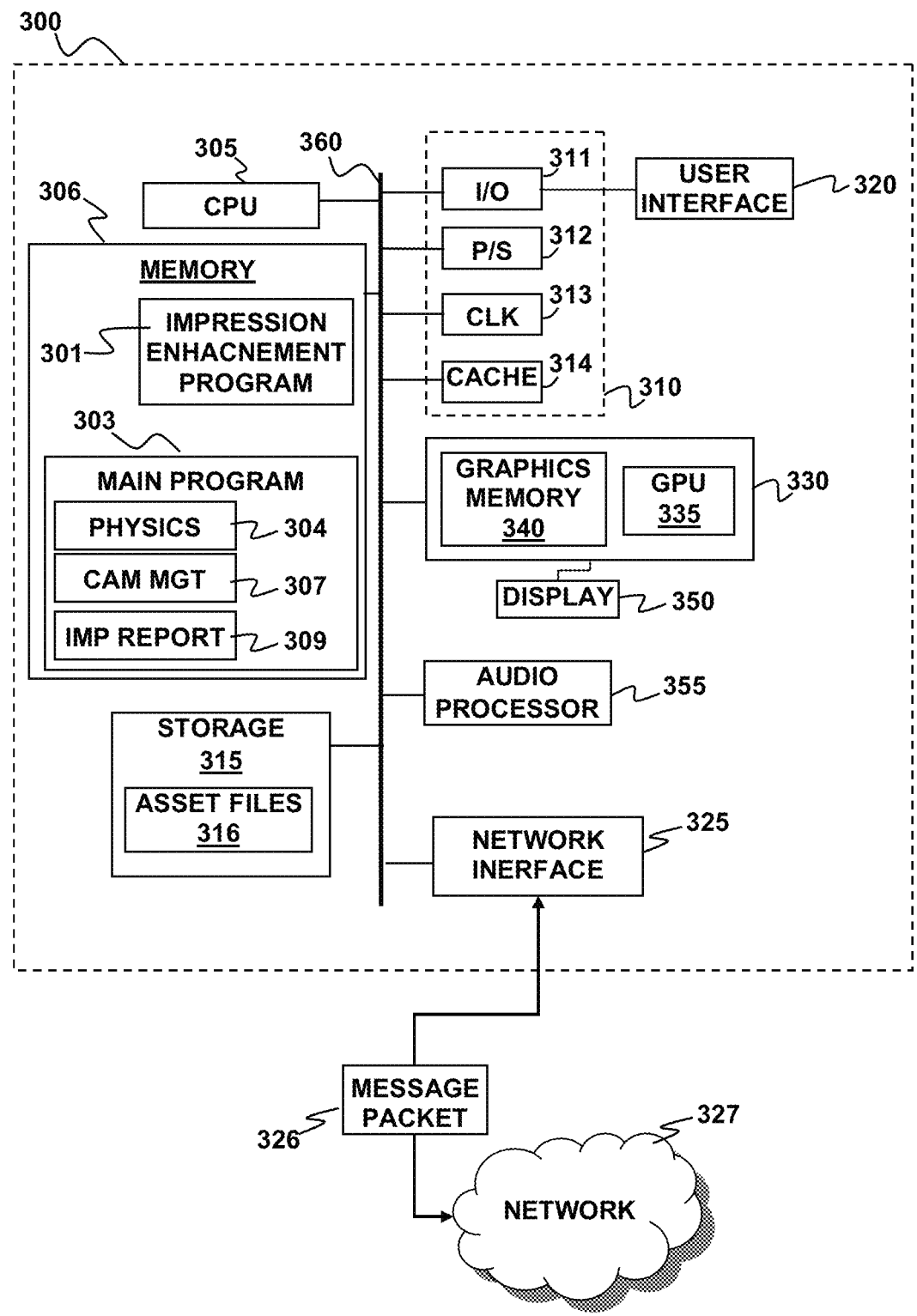
FIG. 6 is a block diagram illustrating an example of a client device according to an embodiment of the present invention.

By way of example, the client device 170 may be configured as shown in FIG. 6, which depicts a block diagram illustrating the components of a client device 300 according to an embodiment of the present invention. By way of example, and without loss of generality, the client device 300 may be implemented as a computer system, such as a personal computer, video game console, personal digital assistant, or other digital device, suitable for practicing an embodiment of the invention. The client device 300 may include a central processing unit (CPU) 305 configured to run software applications and optionally an operating system. The CPU 305 may include one or more processing cores. By way of example and without limitation, the CPU 305 may be a parallel processor module, such as a Cell Processor. An example of a Cell Processor architecture is described in detail, e.g., in Cell Broadband Engine Architecture, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

A non-transitory computer readable medium such as a memory 306 is coupled to the CPU 305. The memory 306 may store applications and data for use by the CPU 305. The memory 306 may be in the form of an integrated circuit, e.g., RAM, DRAM, ROM, and the like). A computer program 301 may be stored in the memory 306 in the form of instructions that can be executed on the processor 305. The instructions of the program 301 may be configured to implement, amongst other things, certain steps of a method for advertising impression enhancement, e.g., as described above with respect to FIGS. 1A-1D and FIG. 2. By way of example, the impression enhancement program 301 may include instructions to add movement to a camera path that directs a camera point-of-view (POV) toward one or more advertising targets encountered along the camera path. The movement added to the camera path is configured to place the advertising targets within the scene displayed on the video display to increase a likelihood a number of advertising impressions associated with one or more of the advertising targets. The program 301 may operate in conjunction with one or more instructions configured to implement an interactive environment. By way of example, such instructions may be part of a main program 303, such as a video game program. Alternatively, the main program 303 may be a program for interfacing with a virtual world. The main program 303 may be configured to display a scene of a portion of the simulated environment from the camera POV on a video display and change the scene as the camera POV changes in response to movement of the camera POV along a camera path during the user's interaction with the simulated environment. The main program may include instructions for physics simulation 304, camera management 307 and reporting advertising impressions 309. The main program 303 may call the impression enhancement program 301, physics simulation instructions 304, camera management instructions 307 and advertising impression reporting instructions 309, e.g., as a functions or subroutines.

The client device 300 may also include well-known support functions 310, such as input/output (I/O) elements 311, power supplies (P/S) 312, a clock (CLK) 313 and cache 314. The client device 300 may further include a storage device 315 that provides non-volatile storage for applications and data. The storage device 315 may be used for temporary or long-term storage of auxiliary content assets 316 downloaded from a content server 120. By way of example, the storage device 315 may be a fixed disk drive, removable disk drive, flash memory device, tape drive, CD-ROM, DVD-ROM, Blu-ray, UMD, or other optical storage devices.

One or more user input devices 320 may be used to communicate user inputs from one or more users to the computer client device 300. By way of example, one or more of the user input devices 320 may be coupled to the client device 300 via the I/O elements 311. Examples of suitable input device 320 include keyboards, mice, joysticks, touch pads, touch screens, light pens, still or video cameras, and/or microphones. The client device 300 may include a network interface 325 to facilitate communication via an electronic communications network 327. The network interface 325 may be configured to implement wired or wireless communication over local area networks and wide area networks such as the Internet. The client device 300 may send and receive data and/or requests for files via one or more message packets 326 over the network 327.

The client device 300 may further comprise a graphics subsystem 330, which may include a graphics processing unit (GPU) 335 and graphics memory 340. The graphics memory 340 may include a display memory (e.g., a frame buffer) used for storing pixel data for each pixel of an output image. The graphics memory 340 may be integrated in the same device as the GPU 335, connected as a separate device with GPU 335, and/or implemented within the memory 306. Pixel data may be provided to the graphics memory 340 directly from the CPU 305. Alternatively, the CPU 305 may provide the GPU 335 with data and/or instructions defining the desired output images, from which the GPU 335 may generate the pixel data of one or more output images. The data and/or instructions defining the desired output images may be stored in memory 310 and/or graphics memory 340. In an embodiment, the GPU 335 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 335 may further include one or more programmable execution units capable of executing shader programs.

The graphics subsystem 330 may periodically output pixel data for an image from the graphics memory 340 to be displayed on a video display device 350. The video display device 350 may be any device capable of displaying visual information in response to a signal from the client device 300, including CRT, LCD, plasma, and OLED displays. The computer client device 300 may provide the display device 350 with an analog or digital signal. By way of example, the display 350 may include a cathode ray tube (CRT) or flat panel screen that displays text, numerals, graphical symbols or images. In addition, the display 350 may include one or more audio speakers that produce audible or otherwise detectable sounds. To facilitate generation of such sounds, the client device 300 may further include an audio processor 355 adapted to generate analog or digital audio output from instructions and/or data provided by the CPU 305, memory 306, and/or storage 315.

The components of the client device 300, including the CPU 305, memory 306, support functions 310, data storage 315, user input devices 320, network interface 325, and audio processor 355 may be operably connected to each other via one or more data buses 360. These components may be implemented in hardware, software or firmware or some combination of two or more of these.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A computer-implemented method, comprising:
   a) displaying a scene of a portion of a simulated environment within a field of view of a virtual camera from a virtual camera point of view (camera POV) on a video display;
   b) changing the scene displayed during a user's interaction with the simulated environment; and
   c) deliberately placing more of an advertising target within the field of view to increase a likelihood of generating an advertising impression compared to a likelihood of generating an advertising impression had more of the advertising target not been placed in the field of view, wherein the advertising target is characterized by a field of attraction of the camera POV.

2. The method of claim 1, wherein the advertising target is a moving advertising target.

3. The method of claim 2, wherein a velocity vector of the moving advertising target is calculated such that more of the advertising target moves to within the field of view.

4. The method of claim 1 wherein c) includes identifying a situation in which an advertising target would be at least partly visible in the scene displayed on the video display in the interval Δt but is either (i) obscured by another object in the scene displayed on the video display to a degree that an advertising impression would not be generated, (ii) not visible in the scene displayed for a sufficient time to generate an advertising impression, (iii) visible at too large a viewing angle to generate an advertising impression, (iv) visible but with insufficient resolution to generate an advertising impression, or some combination of two or more of (i), (ii), (iii) or (iv).

5. The method of claim 1 wherein c) includes identifying a situation in which an advertising target would be outside a frame of the scene displayed on the video display but sufficiently close to the camera path that, with a deviation of the camera path that would not cause the scene displayed on the video display to appear nausea-inducing, jarring or unnatural to the user, the advertising target could be placed in the frame: (a) without being obscured by another object in the scene displayed on the video display to a degree that an advertising impression would not be generated, (b) for a sufficient time to generate an advertising impression, (c) at a viewing angle small enough to generate an advertising impression, and (d) with sufficient resolution to generate an advertising impression.

6. The method of claim 1 wherein c) includes calculating a deviation of a camera path from an initial camera path to generate a revised camera path by determining a shift in a location of a camera point of view (POV) and/or a tilt and/or pan of the camera POV that would place an advertising target within a frame of the scene displayed on the video display (a) without being obscured by another object in the scene displayed on the video display to a degree that an advertising impression would not be generated, (b) for a sufficient time to generate an advertising impression, (c) at a viewing angle small enough to generate an advertising impression, and (d) with sufficient resolution to generate an advertising impression.

7. The method of claim 6, further comprising determining whether displaying the scene according to the revised camera path during the time interval Δt would cause the scene displayed on the video display to appear nausea-inducing, jarring or unnatural to the user, and either:
displaying the scene according to the revised camera path during the time interval Δt if it is determined that displaying the scene according to the revised camera path during the time interval Δt would not cause the scene displayed on the video display to appear nausea-inducing, jarring or unnatural to the user; or
displaying the scene according to the initial camera path during the time interval Δt if it is determined that displaying the scene according to the revised camera path during the time interval Δt would cause the scene displayed on the video display to appear nausea-inducing, jarring or unnatural to the user.

8. The method of claim 6 further comprising associating an attraction strength with the advertising target and wherein calculating a deviation of the camera path from the initial camera path includes taking the attraction strength into account when calculating a deviation of a position, velocity, orientation or rate of change of orientation of the camera POV.

9. The method of claim 6, wherein c) includes adding the movement to the camera path to movement of the camera POV resulting from a user-initiated movement commands or interaction with the simulated environment.

10. The method of claim 6 wherein c) includes adding a tilt or pan to the camera path to direct the camera POV toward the advertising target.

11. The method of claim 6 wherein c) includes adding a shift of a location of the camera POV to the camera path.

12. The method of claim 6 wherein c) further includes limiting an amount and/or rate of the deviation of the camera path in a manner calculated to avoid displaying the scene in way that would appear nausea-inducing, jarring or unnatural to the user.

13. The method of claim 1, further comprising recording one or more advertising impressions associated with the advertising target during the user's interaction with the simulated environment.

14. The method of claim 1, further comprising reporting a number of advertising impressions during the user's interaction with the simulated environment to a reporting server.

15. The method of claim 1, wherein c) includes adding the movement to the camera path independent of a user-initiated movement command or interaction with the simulated environment.

16. A client device configured to increasing a number of advertising impressions during user interaction with an interactive environment containing one or more advertising targets, comprising:
a processor;
a memory coupled to the processor;
one or more instructions embodied in memory for execution by the processor, the instructions being configured to implement a method for increasing the number of advertising impressions, the instructions comprising:
a) displaying a scene of a portion of a simulated environment within a field of view of a virtual camera from a virtual camera point of view (camera POV) on a video display;
b) changing the scene displayed during a user's interaction with the simulated environment; and
c) deliberately placing more of an advertising target within the field of view to increase a likelihood of generating an advertising impression compared to a likelihood of generating an advertising impression had more of the advertising target not been placed in the field of view, wherein the advertising target is characterized by a field of attraction of the camera POV.

17. A non-transitory computer-readable medium having embodied therein one or more computer-readable instructions that, when executed, implement a method for increasing a number of advertising impressions during user interaction with an interactive environment containing one or more advertising targets, a computer, the instructions comprising:
a) displaying a scene of a portion of a simulated environment within a field of view of a virtual camera from a virtual camera point of view (camera POV) on a video display;
b) changing the scene displayed during a user's interaction with the simulated environment; and
c) deliberately placing more of an advertising target within the field of view to increase a likelihood of generating an advertising impression compared to a likelihood of generating an advertising impression had more of the advertising target not been placed in the field of view, wherein the advertising target is characterized by a field of attraction of the camera POV.

* * * * *